(12) United States Patent
Bachmutsky et al.

(10) Patent No.: US 11,748,178 B2
(45) Date of Patent: Sep. 5, 2023

(54) SCALABLE AND ACCELERATED FUNCTION AS A SERVICE CALLING ARCHITECTURE

(71) Applicant: Intel Corporation, Santa Clara, CA (US)

(72) Inventors: Alexander Bachmutsky, Sunnyvale, CA (US); Raghu Kondapalli, San Jose, CA (US); Francesc Guim Bernat, Barcelona (ES); Vadim Sukhomlinov, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 198 days.

(21) Appl. No.: 16/836,650

(22) Filed: Mar. 31, 2020

(65) Prior Publication Data

US 2020/0226009 A1 Jul. 16, 2020

Related U.S. Application Data

(60) Provisional application No. 62/828,369, filed on Apr. 2, 2019.

(51) Int. Cl.
*G06F 9/54* (2006.01)
*G06F 8/41* (2018.01)
(Continued)

(52) U.S. Cl.
CPC .............. *G06F 9/544* (2013.01); *G06F 8/44* (2013.01); *G06F 9/547* (2013.01); *G06F 12/10* (2013.01);
(Continued)

(58) Field of Classification Search
CPC . G06F 9/544; G06F 8/44; G06F 9/547; G06F 12/10; G06F 21/52;
(Continued)

(56) References Cited

U.S. PATENT DOCUMENTS

2002/0035606 A1\* 3/2002 Kenton .................. G06Q 40/04
705/37
2003/0187860 A1\* 10/2003 Holland .............. G06F 16/1774
(Continued)

OTHER PUBLICATIONS

Google Developers, "Protocol Buffers", https://web.archive.org/web/20181006101322/https://developers.google.com/protocol-buffers/docs/overview, Aug. 23, 2018, 8 pages.
(Continued)

*Primary Examiner* — Tuan C Dao
(74) *Attorney, Agent, or Firm* — Compass IP Law PC

(57) ABSTRACT

Examples described herein relate to requesting execution of a workload by a next function with data transport overhead tailored based on memory sharing capability with the next function. In some examples, data transport overhead is one or more of: sending a memory address pointer, virtual memory address pointer or sending data to the next function. In some examples, the memory sharing capability with the next function is based on one or more of: whether the next function shares an enclave with a sender function, the next function shares physical memory domain with a sender function, or the next function shares virtual memory domain with a sender function. In some examples, selection of the next function from among multiple instances of the next function based on one or more of: sharing of memory domain, throughput performance, latency, cost, load balancing, or service legal agreement (SLA) requirements.

24 Claims, 16 Drawing Sheets

(51) Int. Cl.
*G06F 12/10* (2016.01)
*G06F 21/52* (2013.01)
(52) U.S. Cl.
CPC ........ *G06F 21/52* (2013.01); *G06F 2212/657* (2013.01); *G06F 2221/033* (2013.01); *G06F 2221/2149* (2013.01)
(58) Field of Classification Search
CPC ......... G06F 2212/657; G06F 2221/033; G06F 2221/2149; G06F 21/57; G06F 9/5038
See application file for complete search history.

(56) References Cited

U.S. PATENT DOCUMENTS

| | | | | |
|---|---|---|---|---|
| 2005/0021689 | A1* | 1/2005 | Marvin | G06F 8/31 709/220 |
| 2005/0114528 | A1* | 5/2005 | Suito | H04L 69/329 709/228 |
| 2008/0155169 | A1* | 6/2008 | Hiltgen | G06F 9/5077 711/6 |
| 2008/0275719 | A1* | 11/2008 | Davis | G06Q 30/02 705/1.1 |
| 2011/0231862 | A1* | 9/2011 | Walsh | G06F 13/00 719/318 |
| 2013/0226890 | A1* | 8/2013 | Markus | G06F 16/2365 707/703 |
| 2014/0359632 | A1* | 12/2014 | Kishan | G06F 9/4881 718/103 |
| 2015/0046661 | A1* | 2/2015 | Gathala | G06F 12/023 711/147 |
| 2015/0046920 | A1* | 2/2015 | Allen | G06F 9/45558 718/1 |
| 2015/0058392 | A1* | 2/2015 | Krimchansky | H04L 67/10 709/201 |
| 2015/0229645 | A1* | 8/2015 | Keith | H04L 63/10 726/4 |
| 2015/0282059 | A1* | 10/2015 | Nayak | H04W 48/18 455/452.1 |
| 2016/0092678 | A1* | 3/2016 | Probert | G06F 21/53 713/193 |
| 2016/0283382 | A1* | 9/2016 | Fahim | G06F 12/0824 |
| 2016/0380848 | A1* | 12/2016 | Raney | H04L 43/0876 709/213 |
| 2017/0010986 | A1* | 1/2017 | Coddington | G06F 9/5022 |
| 2017/0364450 | A1* | 12/2017 | Struttmann | H04L 63/123 |
| 2018/0088993 | A1* | 3/2018 | Gerdesmeier | G06F 9/5077 |
| 2018/0188744 | A1* | 7/2018 | Switkes | G05D 1/0088 |
| 2018/0330092 | A1* | 11/2018 | Sniezek | G06F 21/57 |
| 2019/0138240 | A1* | 5/2019 | Gayen | G06F 3/0604 |

OTHER PUBLICATIONS

GRPC Authors, "A high performance, open-source universal RPC framework", https://web.archive.org/web/20181010155142/https://www.grpc.io/, Oct. 10, 2018, 4 pages.
Khan, Janshair, "Demystifying Protocol Buffers and gRPC with Go", https://kjanshair.github.io/2018/08/20/demystifying-protocol-buffers-and-grpc-with-go/, posted Aug. 20, 2018, 7 pages.
Limmer, Ben, "Building a Scaleable Protocol Buffers/gRPC Artifact Pipeline", published in Building Ibotta, Jun. 4, 2018, 19 pages.

* cited by examiner

US 11,748,178 B2

SCALABLE AND ACCELERATED FUNCTION AS A SERVICE CALLING ARCHITECTURE

RELATED APPLICATION

The present application claims the benefit of a priority date of U.S. provisional patent application Ser. No. 62/828,369, filed Apr. 2, 2019, the entire disclosure of which is incorporated herein by reference.

DESCRIPTION

Static function calling within a single compiled and linked module is commonly used. Dynamic function calling for cloud native use cases is more complex and is served today by mechanisms like remote procedure calls (RPC) and Google RPC (gRPC) with various service registration, advertisement and discovery schemes. A challenge arises when there are multiple instances of a particular function or multiple implementations from different service providers of a particular function (e.g., function as a service (FaaS)) deployed across the network with various capabilities, location, cost, service level agreement (SLA), performance and other key performance indicators (KPIs). Achieving high performance function use given the different requirements can be a challenge.

DETAILED DESCRIPTION

Figure 1:
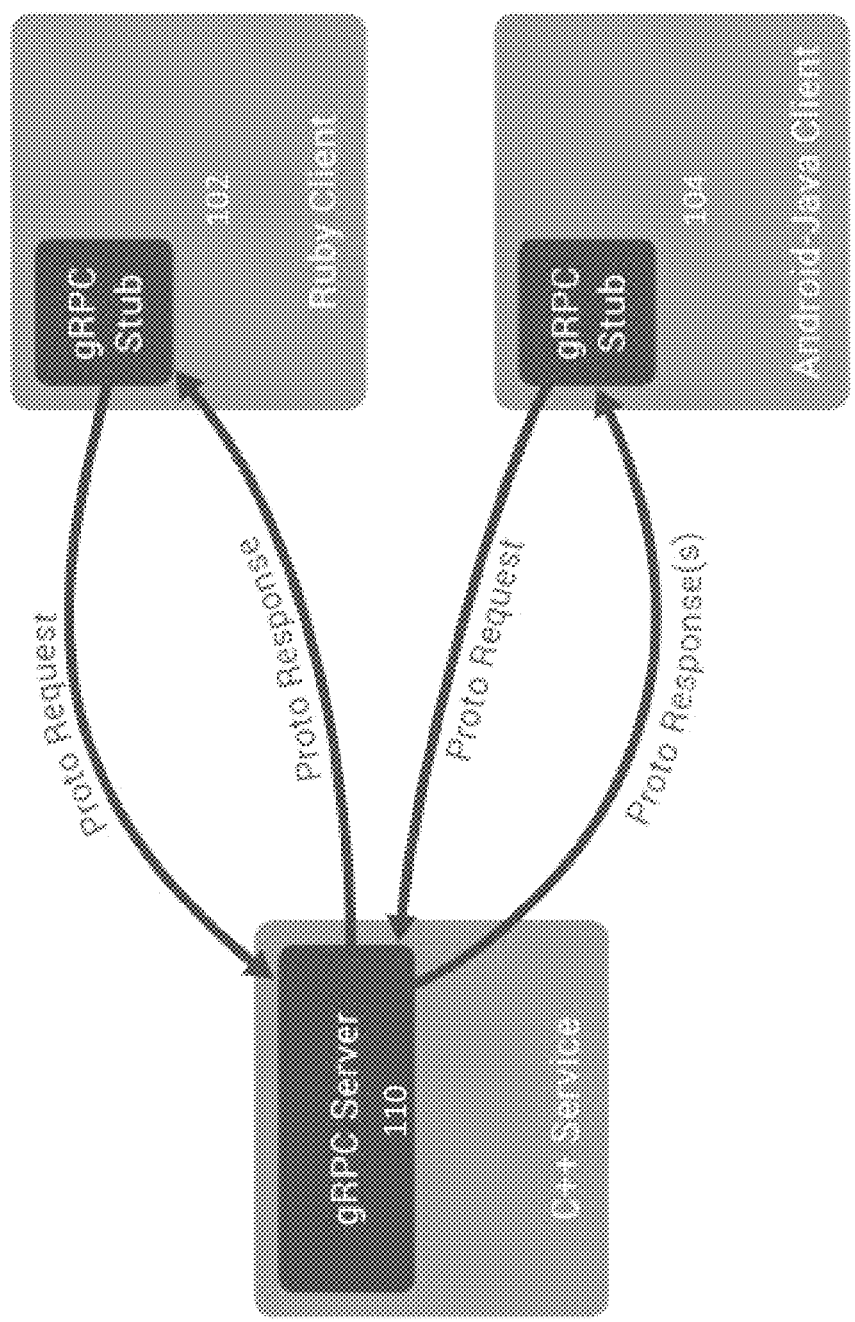
FIG. 1 depicts an example overview of a gRPC.

FIG. 1 depicts an example overview of a gRPC. In gRPC, a client application 102 or 104 can directly call methods on a server application 110 on a different machine as if it was a local object, to create distributed applications and services. gRPC defines a service and specifies manners to remotely call services with their parameters and return types. Server 110 implements this interface and runs a gRPC server to handle client calls. On the client side, client 102 or 104 has a stub (referred to as just a client in some languages) that provides the same methods as the server.

gRPC clients and servers can run and communicate with each other in a variety of environments and can be written in any of gRPC's supported languages. For example, a gRPC server can be created in Java and clients can be written in Go, Python, Ruby, or other languages. By default, gRPC uses protocol buffers (protobufs), an open source mechanism for serializing structured data (although it can be used with other data formats such as JSON).

When working with protocol buffers, a structure is defined for the data to serialize in a proto file, which is an ordinary text file with a .protoextension. Protocol buffer data is structured as messages, where a message is a small logical record of information containing a series of name-value pairs called fields. A simple example is below.

```
message Person {
    string name = 1;
    int32 id = 2;
    bool has_ponycopter = 3;
}
```

After specifying the data structures, protocol buffer compiler protoc can be used to generate data access classes in preferred language(s) from the proto definition. These provide simple accessors for each field (e.g., name( ) and set_name( ) as well as methods to serialize/parse the whole structure to/from raw bytes. For example, if a chosen language is C++, running the compiler on the above example will generate a class called Person. This class can be used in an application to populate, serialize, and retrieve Person protocol buffer messages.

Figure 2:
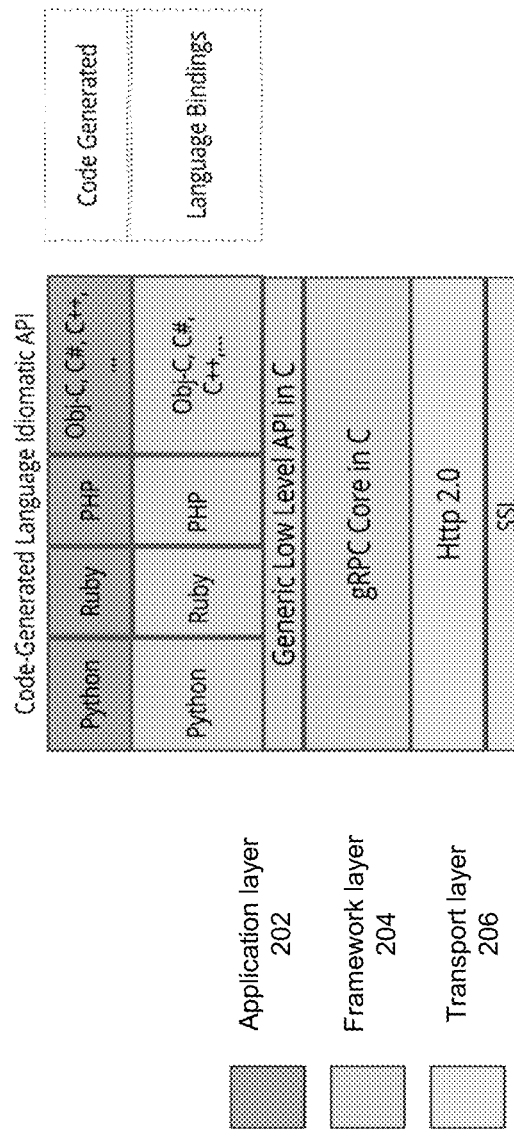
FIG. 2 shows a well-known example gRPC "C" language core stack.

FIG. 2 shows a well-known example gRPC "C" language core stack. As shown, there is an application layer 202, framework layer 204, and transport layer 206. An application layer 202 represents a set of user applications written or fully/partially automatically generated by code generator(s) in various languages. A framework layer 204 includes language-specific bindings to translate application requests into an API to common gRPC Core module (C-based API and Core are shown). A transport layer 206 is responsible for sending and receiving requests and responses over the network using various protocols (HTTP 2.0 over SSL is shown).

Figure 3:
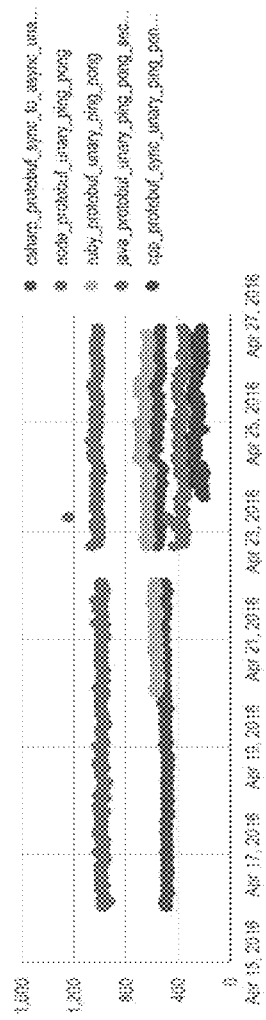
FIG. 3 shows an example of performance of a gRPC operation using a variety of different application languages.

FIG. 3 shows an example of performance of a gRPC operation using a variety of different application languages. gRPC assumes location-independent connectivity between client and server. gRPC can have limitations of message transmit rate performance. In an example hardware and software platform, a rate of 350,000 message/second message transmit rate can be achieved for the entire server. Even if the measurement is not done on the most advanced central processing unit (CPU), this message rate can be unacceptably low. Assuming 200 Gbps traffic per server, a service chain of 5 services for every packet will generate close to 1 Tbps of gRPC traffic, which may not be acceptable under transmit rate limitations. In addition, the above performance will be similar even if client and server are run on the same server, socket, or core and/or shared memory.

Another limitation with gRPC is in its security and quality of service (QoS) mechanisms. Communication parties are authenticated only at the connection time, not per packet, hence secured transport layer is used to provide at least some level of security. gRPC does not provide a mechanism or service for managing performance for access control list (ACL), QoS, rate limiting, traffic management, or service level agreement (SLA).

In a case where two modules run on a same core or module and are programmed in the same language, gRPC may be invoked or gRPC translation may be invoked, which introduces overhead and limits on message transmissions. In many cases, for communications between modules, there is not much diversity in terms of language, CPU, and so forth.

Communication between modules (software applications or hardware) in a same data center or platform may not need to utilize or experience the gRPC data transformation overhead. Accordingly, translation aspects of gRPC may not be needed.

Various embodiments provide for function-to-function chaining whereby a calling function calls a called function with a function performance request and a transport scheme for the function performance request is selected by taking into account one or more of: whether the called function is trusted, the called function is a same language as that the calling function, or the called function is local to or remote from the calling function. A level of overhead used in transporting the function performance request from the calling function to the called function and data transport can be selected based on the level of trust with the called function, language of the called function, or local or remote nature of the called function relative to the calling function.

Various embodiments provide an architecture and acceleration schemes to implement high performance dynamic multi-instance location-independent function calling targeted for highly scalable cloud native use cases, such as FaaS and gRPC acceleration, among others. Although gRPC is an example, any other communication schemes can be used such as but not limited to Java Remote Method Invocation, Modula-3, RPyC, Distributed Ruby, Erlang, Elixir, Action Message Format, Remote Function Call, Open Network Computing RPC, JSON-RPC, and so forth. Various embodiments provide an optimized architecture and acceleration to take advantage of localities of communicating entities among caller and called functions, including core locality (e.g., same or shared cores used by caller and called functions), socket locality, (e.g., same or shared CPU socket used by caller and called functions), rack locality (e.g., same or shared rack used by caller and called functions), server locality (e.g., same or shared server used by caller and called functions), and/or memory locality (e.g., same or shared physical or virtual memory domain used by caller and called functions). Various embodiments provide acceleration schemes for target function lookup across callable functions from a particular location and point of time, in compliance with an applicable service level agreement (SLA). Various embodiments can accelerate data copies from a caller to a called or vice versa. Embodiments can be transparent to the communicating entities (e.g., functions, applications, containers, and so forth). Various embodiments provide static and dynamic link libraries can be combined together with multi-instance RPCs into a single high-performance application-transparent framework.

Serverless applications can be tied together in a sequence or chain of two or more applications or functions. A serverless application or function (e.g., FaaS) can use available computing resources at a data center, edge computing device, or fog network device. For example, for a serverless application, a cloud service provider dynamically manages allocation and provisioning of servers and a serverless application runs in stateless compute containers that are event-triggered and may last for one invocation. A serverless application can be event-driven, cloud-based application where application development relies on a combination of third-party services, client-side logic and cloud-hosted remote procedure calls. Serverless application can be pay-per-use computing or bare-code where users are charged based on time and computing resources (e.g., CPU, networking, or memory) allocated to run serverless application without associated fees for idle time of computing resources. In some examples, a serverless application or function can be performed by a network infrastructure device (e.g., forwarding element, router, switch, network interface controller) or accelerator, in addition or alternative to use of a server or general purpose computing platform.

Figure 4:
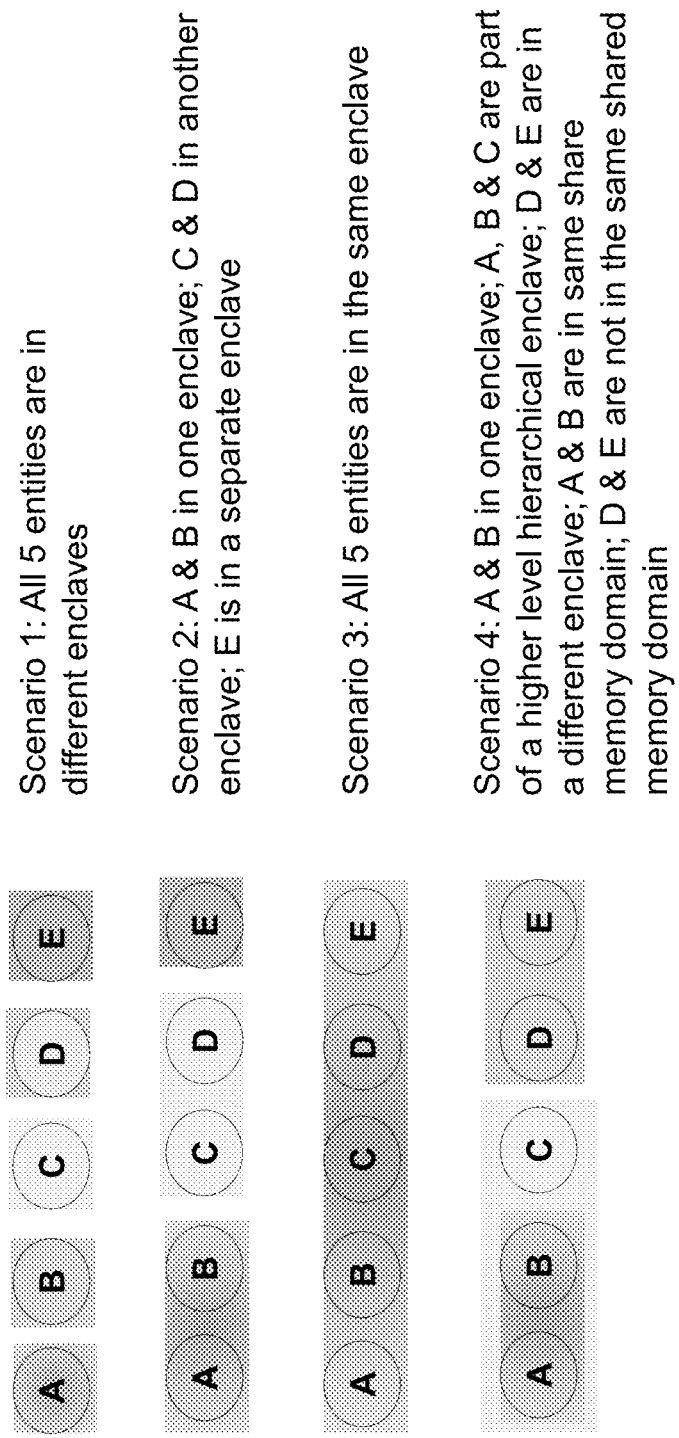
FIG. 4 depicts an example allocation of enclaves for entities.

FIG. 4 depicts an example allocation of enclaves for entities. An example is described next of a service chain of A->B->C->D->E, whereby function A calls function B, function B calls function C, function C calls function D, and function D calls function E. Brackets define the enclave, such as (A->B), where A and B share an enclave. The following are few examples of the above service chain with enclave notation:

1. (A)->(B)->(C)->(D)->(E)
2. (A->B)->(C->D)->(E)
3. (A->B->C->D->E)
4. ((A->B)->C)->(D->E)

For example, enclaves A, B, C, D and E can be are entities such as containers, virtual machines, applications, pods, racks, servers, and so forth. Functions or applications can be deployed in an enclave, examples of which are described herein. Functions or applications in the same enclave can be considered "trusted" and share memory space and invoke operations on each other with lower levels of authentication. But functions or applications in different enclaves may not have the same level of trust, as is described herein.

An example enclave can be a Trusted Execution Environment (TEE) that is an isolated execution environment that provides security features such as isolated execution, integrity of applications executing with the TEE, along with confidentiality of their assets. TEEs help defend against attacks targeting underlying layers of the stack, including the operating system, hypervisor, drivers, and firmware, by providing specialized execution environments known as "enclaves." TEE can be a control plane for an enclave but may include some hardware enforcement logic.

An example enclave can be a logical collection of entities which belong to the same "trusted" domain with secure communication between entities. There can be multiple enclaves within a pod. An enclave can span across multiple pods. An enclave may include one or more shared memory domains. Entities within an enclave may contain non-shared memory regions. There may be trust relationship between enclaves. An enclave may expose parts of memory to other enclaves.

For example, enclaves can be created using one or more of: Intel® SGX, AMD Memory Encryption Technology, AMD Secure Memory Encryption (SME), ARM® TrustZone®, Apple Secure Enclave, or Qualcomm® Trusted Execution Environment.

In the examples, arrows outside of parentheses ( ) indicate transactions with untrusted enclaves and can use full data copy and optional extra security. For arrows inside of parentheses ( ) transactions between functions or applications can be considered trusted and there are various options. For option (a), both gRPC client and server are in the same virtual memory space and data transport overhead can be used to pass pointer(s) to share data. For option (b), gRPC client and server are in the same physical but different virtual memory spaces and use data transport overhead of a pointer passing and pointer translation may be applied but a data copy from caller to a called or from called to caller can potentially be avoided. For option (c), gRPC client and server are in different physical memory spaces and data transport overhead of copying data can be used where the data is optionally secured/encrypted. For using distributed shared memories architectures, the aforementioned mechanisms for pointers can be used as well.

An example virtual memory domain permits entities that are part of this domain to share data without any address translations (e.g., using pointers). In some examples, virtual memory can span across cores/sockets but not across servers. This can be expanded to distributed share memory concepts where virtual memory domain may go beyond a single server.

In an example physical memory domain, entities that are part of this domain can share data but use address translations (e.g., using pointers and address translation). Physical memory domain may span across servers assuming an interconnect which supports memory mapped constructs.

From a performance point of view, option (a) above is the fastest, option (b) is fast (e.g., because of efficiently translating pointers and walk through page tables which is performed for translation lookaside buffer (TLB) or instruction-TLB), whereas option (c) can be slowest because of data encryption and copy operations. However, for option (c), accelerated encryption and/or direct memory access (DMA) may be available and used, still with some overhead.

FIG. 4 depicts four scenarios of entity-to-enclave allocations. In scenario 1, all 5 entities are in different enclaves and entities would use option (c) to invoke operations or pass data. In scenario 2, entities A and B share an enclave, entities C and D share another enclave, and entity E is in a separate enclave. Entities A and B can use option (a), entities C and D can also use option (a), but for entity A or B to request an operation or transfer data with any of entities C-E, option (b) or (c) could be used. Similarly, for entity C or D to request an operation or transfer data with any of entities A, B, or E, option (b) or (c) could be used. Entity E could use option (b) or (c) to request an operation or transfer data with any of entities A-D. Selecting (b) or (c) in above examples could depend on physical memory mapping across enclaves. If different enclaves run in different physical memory domains for security reasons, (c) can be used.

In scenario 3, entities A-E are in the same enclave and can use option (a) to request an operation or transfer data with any entity. In scenario 4, A and B are in the same enclave and entities A, B, and C are part of a higher level hierarchical enclave. Entities D and E are in a same enclave but different from that of entities A-C. Entities A and B share a memory domain whereas D and E do not share memory domain with entities A and B or C. Entity C does not share a memory domain with A, B, D, or E. Accordingly, entities that share an enclave and a virtual memory domain can use option (a), entities that do not share a virtual memory domain but share an enclave can potentially use option (b), if mapped into the same physical memory domain, and entities that do not share a memory domain and do not share an enclave can use option (c).

Various examples can apply to one or more of: (1) a server that is within and across a CPU socket, (2) rack that a pod is a loadable module, (3) an enclave is a run-time construct, and/or (4) enclaves and shared memory domains are bi-directional in nature but no inheritance assumed. For example, a pod can be a logical collection of containers which share networking and may share other resources including memory (hosted in compute elements) or acceleration schemes, e.g., FPGA, network interfaces, etc.

In an example function boundary, a callable procedure/subroutine can be treated as a function and dynamic global control plane and data plane lookup tables may require very high scalability. Alternatively, granularity can be defined much larger, so all internal calls are compiled and linked to optimize calls and universal call table sizes. For example, if the source code defines a function with "extern," it will use universal calls and can be discoverable.

Figure 5:
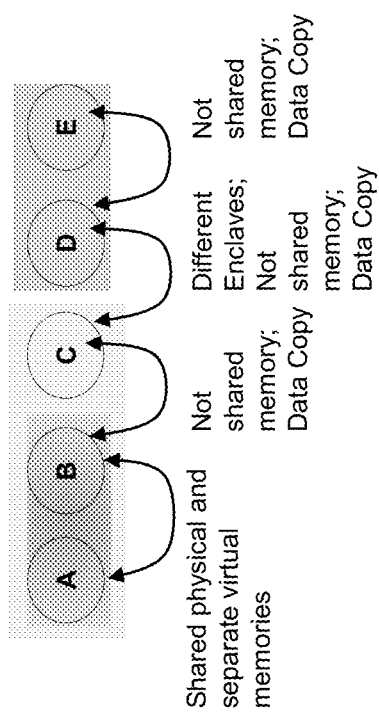
FIG. 5 depicts an example of data availability within and across enclaves.

An example of the scenario 4 is described next. FIG. 5 depicts an example of data availability within and across enclaves using various data transport overhead. In this example, clients A and B are in a trust enclave and can share data in memory with data transport overhead of pointer passing. For example, clients A and B can be in a same virtual machine or separate virtual machines. Separate virtual spaces can involve translating pointer from one virtual space to another virtual space. For instance, client A could have one memory space for communication with client B in a private manner (peer-to-peer) and client A can have another memory space for communication with B, C, D and E in a service chain, and so on. In this scenario, client A could send data to B using a private peer-to-peer memory space, but then B will send a copy of the data when sending the data to C. Alternatively, A could send data to B using the shared memory space among A-C for the A->B->C chain, so no data copies are used.

Accordingly, a fully trusted environment (e.g., TEE) can involve entities that are in a same enclave and to provide pointer to share data. Partial trust can be entities are in a higher level hierarchical enclave and to share data, an entity provides a pointer and pointer translation is used. For entities that are not in a shared enclave or are in a higher level enclave, to share data, data is encapsulated or sent using variable level of encapsulation (even if in a same server).

For instance, compute express link (CXL) fabric could provide global memory sharing across physical servers. Data sharing within an enclave or higher level enclave could physically use untrusted fabric component (like accessing remote memory using, e.g., remote direct memory access (RDMA), compute express link (CXL), and so forth), and data will be protected (e.g., authenticated, encrypted, virtualized, etc.). From a security point of view, both data copy and data access security can be used, including an option for encrypted memory with shared keys between entities within the same enclave. An entity does not need to have only a single memory space but can have multiple memory spaces. Note that entities within an enclave may share memory but not necessarily.

Figure 6A:
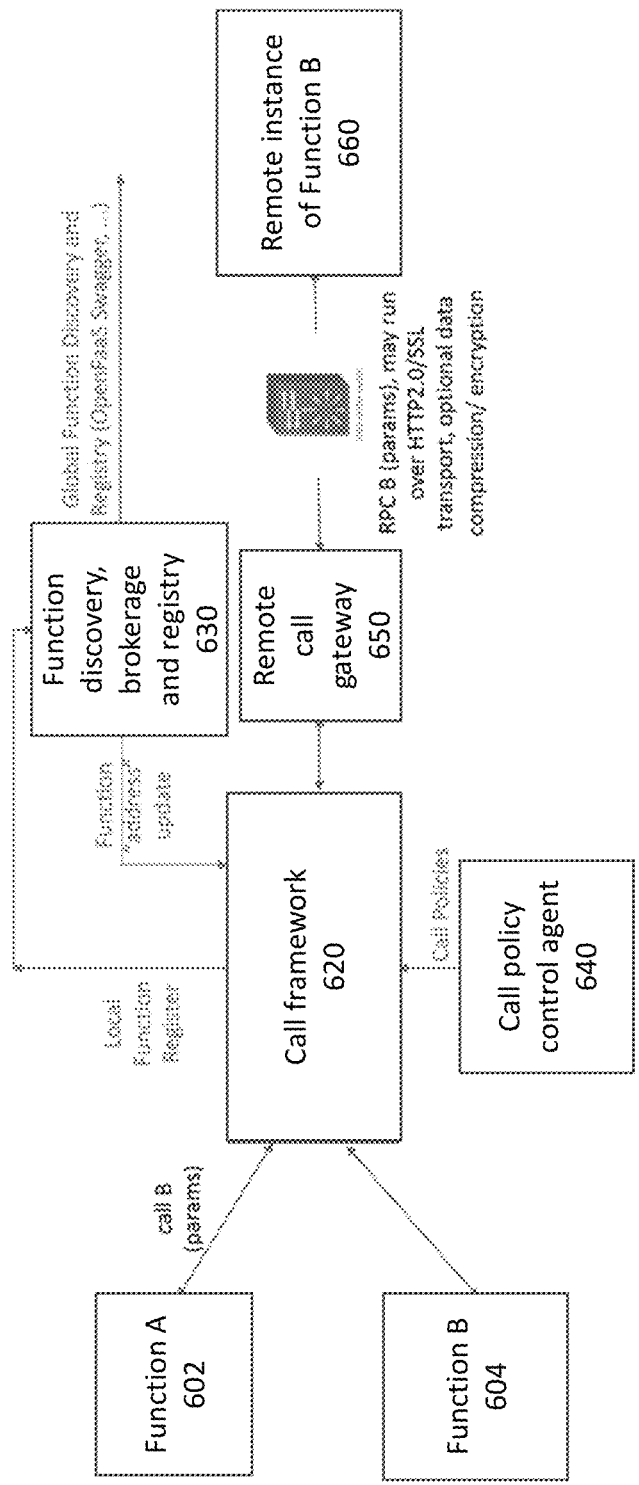
FIG. 6A depicts a high level architecture for an accelerated data sharing framework.

FIG. 6A depicts a high level architecture for an accelerated data sharing framework. Function (Func) A 602 can be a client (sender). Function B 604 can be a server (receiver). In some examples, Function B can have multiple instances and/or implementations and instantiations of Function B can be local or remote to A. Call framework 620 can select an instance of Function B to use (e.g., local or remote to Function A). Function A 602 and function B 604, depending on deployment scenario and interconnect technologies, can be considered local if they execute on a same core, CPU socket, server, rack, data center, platform, or computer or share virtual or physical memory. A remote function B 660 (e.g., instance of function B) can be accessed using a network, fabric, interconnect and remote function 660 can be executed on a different core, CPU socket, server, rack, data center, platform, or computer.

Function discovery, brokerage and registry 630 can be part of a control plane. Function discovery, brokerage and registry 630 can provide a table or registry of available function instances (e.g., local and remote to Function A). Function discovery, brokerage and registry 630 can influence selection between local or remote function instances of Function B for use by Function A. Call framework 620 enforces selection of a function instance at run-time. Function discovery, brokerage and registry 630 learns where instances of functions are located (e.g., local or remote) by registration of a function with function discovery, brokerage and registry 630 and determines whether a function is local or remote to another function. For example, function discovery, brokerage and registry 630 can determine that an instance of Function B 660 is remote to Function A 602. Function discovery, brokerage and registry 630 can be distributed or centralized at an orchestrator level. Function discovery, brokerage and registry 630 and a call policy control agent 640 can be part of a control plane. A centralized orchestrator can learn distributed registrations. Hierarchical registrations can be performed. For example, function B 660 reports into a local orchestrator, which can inform a centralized orchestrator. For example, OpenFaaS's forum for function discovery and registration (e.g., Swagger) can be used for function registration. In some examples, call framework 620 registers with a control plane on behalf of every local instance (e.g., Function A 602).

Call policy control agent 640 can indicate a preference to use local or remote instances of functions. Call policy control agent 640 can be programmed by an application deployer (e.g., communication service provider (e.g., AT&T, Verizon)). Call policy control agent 640 can program call framework 620 with policies that allow, block, or rate limit calls between any two functions in run-time on per-call basis (e.g., access control list (ACL) per call).

For example, function A 602 can issue a callB with parameters to call or invoke function B. Call framework 620 can select an instance of function B (local or remote to function A) to which to send the callB. In the example of FIG. 6A, call framework 620 selects an instance of function B that is local to function A 602 whereby function B 604 shares a core, rack, server, data center, and/or memory with function A 602. A local function could share the same server, but in the environment when the interconnect between servers is implemented using a memory-mapped fabric (e.g., CXL) such boundary could be much larger.

Figure 6B:
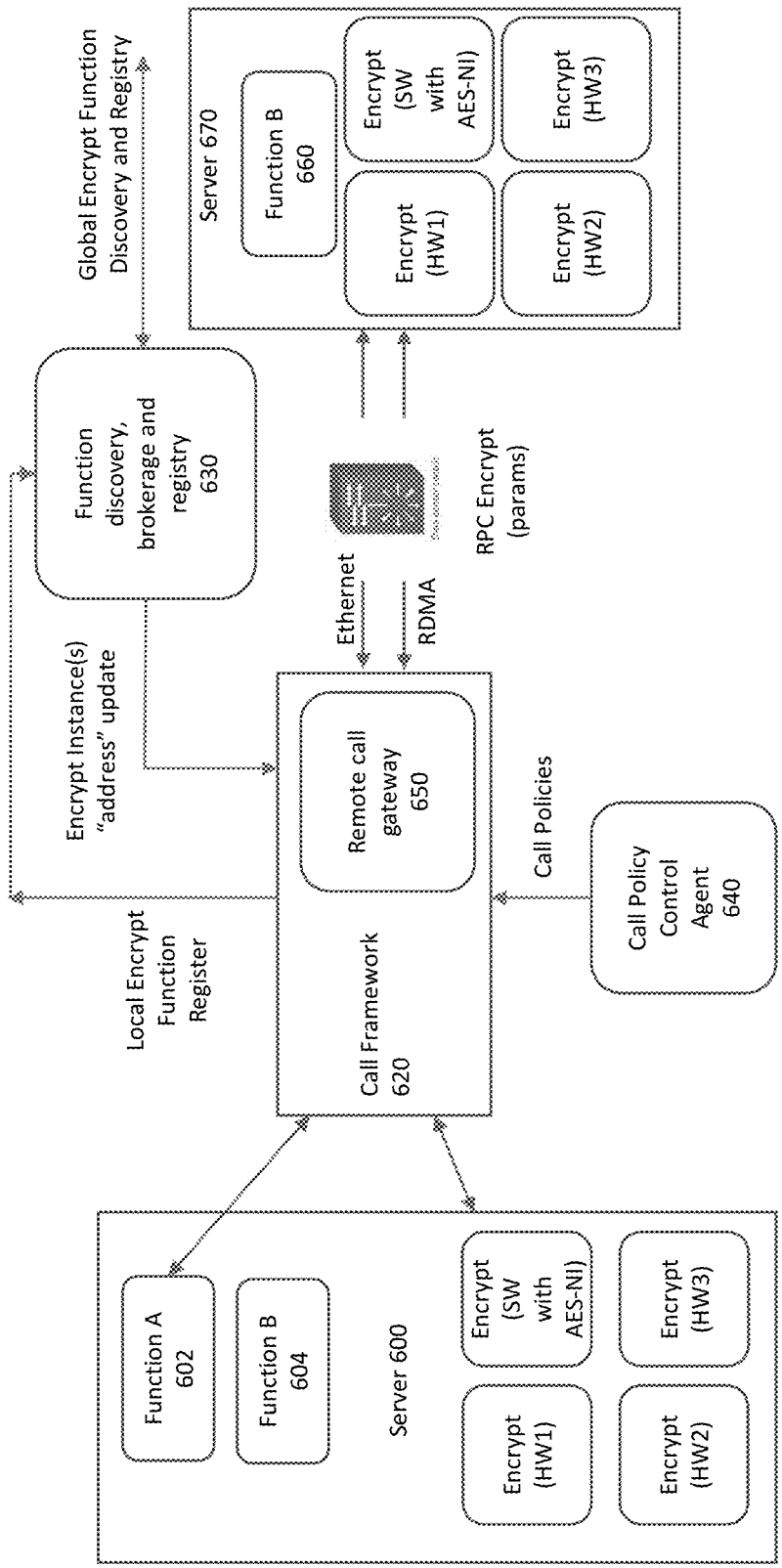
FIG. 6B depicts an example framework.

FIG. 6B depicts an example framework. In this example, function A 602 executes on server 600. In this example, call framework 620, function discovery, brokerage and registry 630 and a call policy control agent 640 can also operate on server 600. Any of call framework 620, function discovery, brokerage and registry 630 and a call policy control agent 640 can operate on server 600. In some examples, another instance or execution of call framework 620, function discovery, brokerage and registry 630 and a call policy control agent 640 can execute on server 670. Server 670 can execute function B 660.

In other examples, function A 602, call framework 620, function discovery, brokerage and registry 630 and a call policy control agent 640 can run on a same CPU node, rack, data center, and so forth. For example, function A 602 can call an encryption operation using Function B. Function B 604 can be local to function A 602 and execute on server 600 or remote from Function A 602 and execute as function B 660 on server 670. For example, various local or remote encryption schemes and encryption scheme implementations are available. For example, encryption of function B can be implemented as specialized hardware (e.g., HW1, HW2, and HW3) or using software that utilizes Intel Advanced Encryption Standard New Instructions (AES-NI) CPU instructions (e.g., SW with AES-NI).

In this particular example, call framework 620 includes a registry of available encryption functions both local and remote from function A 602. Call policy control agent 640 identifies which encryption functions are available for function A 602 to call at a point in time. Function discovery, brokerage and registry 630 can discover local and remote instances and capabilities of encrypt and report those to call framework 620. Call framework 620 selects an instance of Function B to use based on applicable policies described herein.

Various embodiments provide for acceleration of selection of a function to perform a job request using one or more of: special instructions (e.g., part of an instruction set architecture (ISA)), acceleration block within a core or processor, or acceleration block on the same die as the processor.

Figure 7:
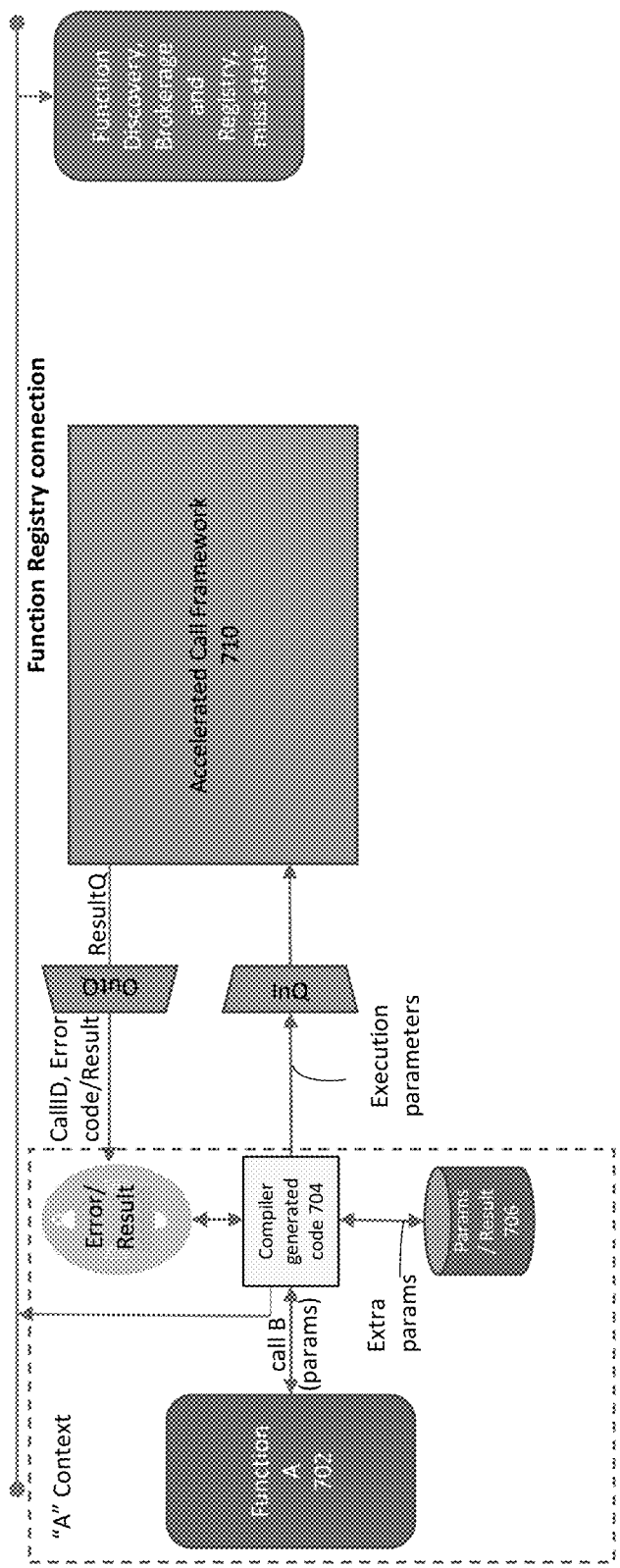
FIGS. 7-11 depict examples of operation of function access.

FIGS. 7-11 depict examples of operation of function access. FIG. 7 depicts an example of a run-time call resolution for a FaaS to call one or multiple available instances of local or remote function. In this example, Function A 702 calls function B with any static function call (e.g., call B with parameters (params)). In some cases, a static function call can use or does not use a remote procedure call (e.g., gRPC). This capability allows preserving the existing code base for function A 702 and function B or with minor modifications to the code base. An auto-generated "hidden" executable code 704 can be generated by a compiler and included with an executable version of Function A 702 and Function B.

In response to callB, execution of code 704 can provide execution parameters to an input queue (InQ). Execution of code 704 can cause translation of the callB into a job entry that includes execution parameters. For example, execution parameters can include a CallID (e.g., map the response to the correct calling function). CallID can be a function of (CallerID, CalledID, ContextID, Seq #)), where CallerID can be a global ID of function A 702; CalledID can be a global ID of function B, not a particular instance of function B; ContextID can be context ID for a tenant to make sure that only tenant-relevant function instances are being considered for the call, and sequence number Seq# that allows to track multiple concurrent calls between the same entities (e.g., Function A 702 calls Function B and then calls it again before receiving the response for the first call). Other execution parameters can include: subset of all parameters (e.g., headers or first cache line of parameters to enable faster access to the data), pointer to the rest of parameters (e.g., if parameters size is larger than the cache line size, provide a pointer to original data already prepared by Function A instead of copying that data into another place (for example, heap) for function calling), or ResultQ (e.g., expected egress queue ID OutQ for the result(s)). Other execution parameters can be provided (e.g., SLA that can include priority and desired/maximum latency to receive results). Compiler generated code 704 can both write Params 706 to be passed to called function and read Result 706 (both shown in a single Params/Result block) received in the response after determining that the response arrived to OutQ. If there is use of protobuf or similar data transformation techniques, then call framework 710 can perform data transformation. Note that call framework 710 can be a part of call framework 620 in FIGS. 6A and 6B, and using acceleration can accelerate run-time functionality of a call framework for performance purposes.

Note that terms ingress and egress queues are used from Accelerated Call Framework point of view where an ingress queue for a function is an egress queue for Accelerated Call Framework and vice versa.

In a case where data from Function A 702 is to be sent to a Function B and the Function B is not in the same enclave with Function A, various actions can take place: (1) the data may be optionally converted into protocol buffers (protobuf) by accelerated call framework 710 calling a corresponding protobuf function; (2) placing a job entry into ingress queue InQ, which is an entry into accelerated call framework 710; (3) waiting for the result to be delivered to queue OutQ (e.g., a queue polling, semaphore wait construct, memory access wait construct); and (4) translating the results into a normal function return of A (e.g., copying result data into a heap or registers). Queues InQ and OutQ could be implemented either as software queues (such as using Data Plane Development Kit (DPDK)), or accelerated hardware (e.g., Hardware Queue Manager) queues for ultimate performance and lower latency.

Various embodiments provide software, even on its lowest level of instructions, that performs a unified manner to invoke call functionality to hide any potential hardware interactions (e.g., with a queue manager) and enables future enhancements in implementation without or only minimal modifications to software of Function A 702. Such call instruction can be an updatable microcode which make actions with other hardware components, potentially implemented outside of a core. Instructions may be configured to be intercepted or cause exception to either emulate functionality on previous generation architectures or to enhance functionality in the future, to add some functionality without breaking legacy applications.

Accelerated call framework 710 can handle calls to local and remote functions similarly with additional functionality used for remote instances of the call transport over a connection (e.g., using a datacenter switch as an example). Accelerated call framework 710 can cause calls and data to be compressed, encrypted, reliable, and so forth. In some examples, remote call gateway 650 can facilitate access functions remote to function A 702.

Figure 8:
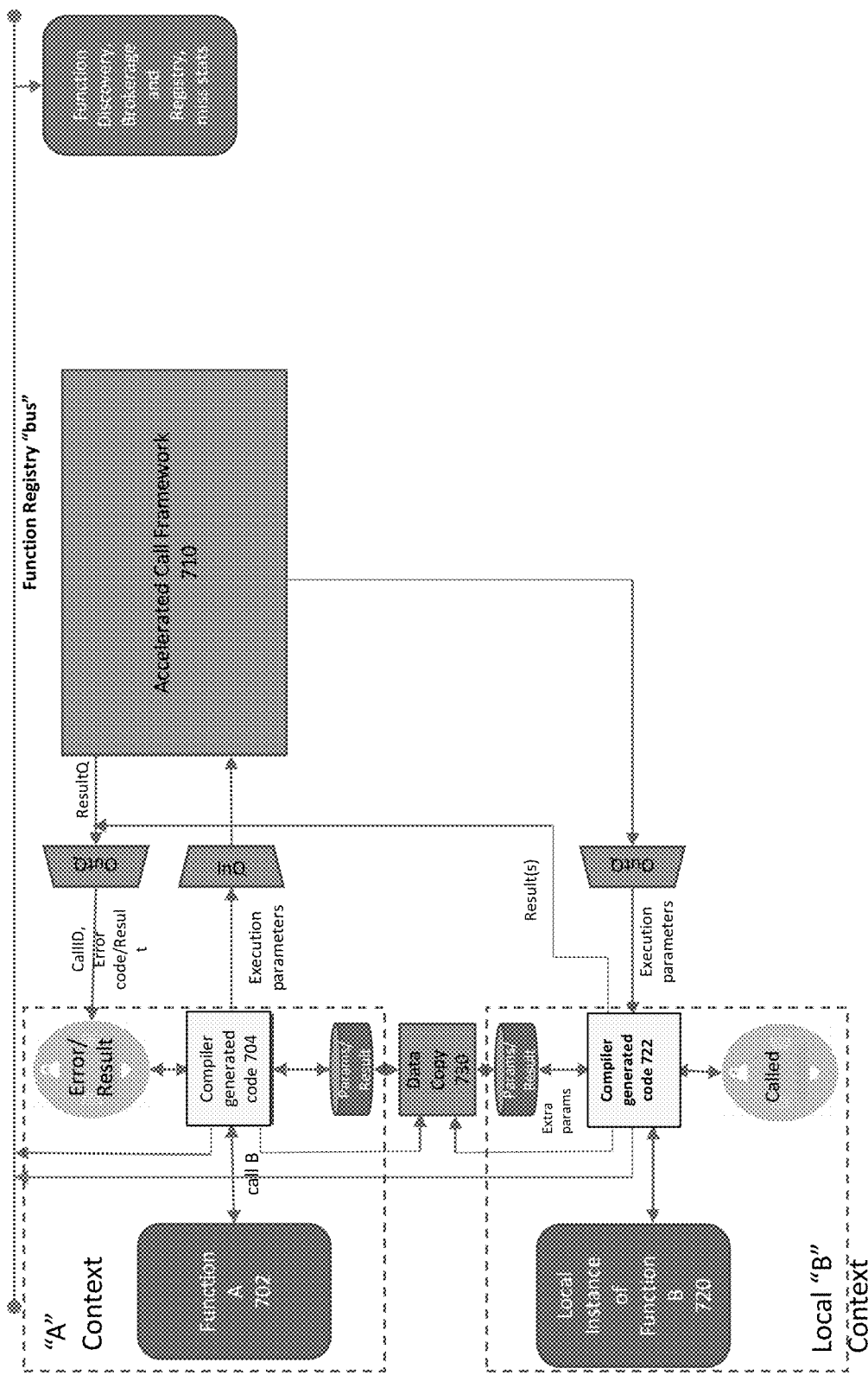

FIG. 8 depicts an example of use of an accelerated call framework. The example of FIG. 8 provides a setup for function B 720 to receive and process calls. In this example, Function B 720 is a called function instance physically or virtually local to Function A 702 (caller). Function A 702 and Function B 720 can share one or more of: core locality (same or shared cores used by caller and called functions), socket locality, (same or shared CPU socket used by caller and called functions), rack locality (same or shared rack used by caller and called functions), server locality (same or shared server used by caller and called functions), and/or memory locality (same or shared physical or virtual memory domain used by caller and called functions).

Compiler generated code 722 can add a doorbell to Function B 720 for waiting to be called using dedicated queue OutQ and a translation of a job entry from the OutQ queue into a set of parameters that function A 702 passed (e.g., the opposite operation compared to function A 702 described in FIG. 7). Compiler generated code 722 can add functionality that may perform pointer translation (e.g., in case of different virtual memory spaces between functions A and B). In some cases, data copy 730 can perform a data copy operation of data from function A 702 to a memory accessible by function B 720 (e.g., in a case of different physical memories used by functions A and B) and similarly in the opposite direction for results returned by function B to function A. The data copy can be performed either in software, CPU microcode, or accelerated by any type of hardware (e.g., direct memory access (DMA)). Command and pointer queueing, pointer translation, or data copy implementations can be transparent to Function A 702 and Function B 720.

Figure 9:
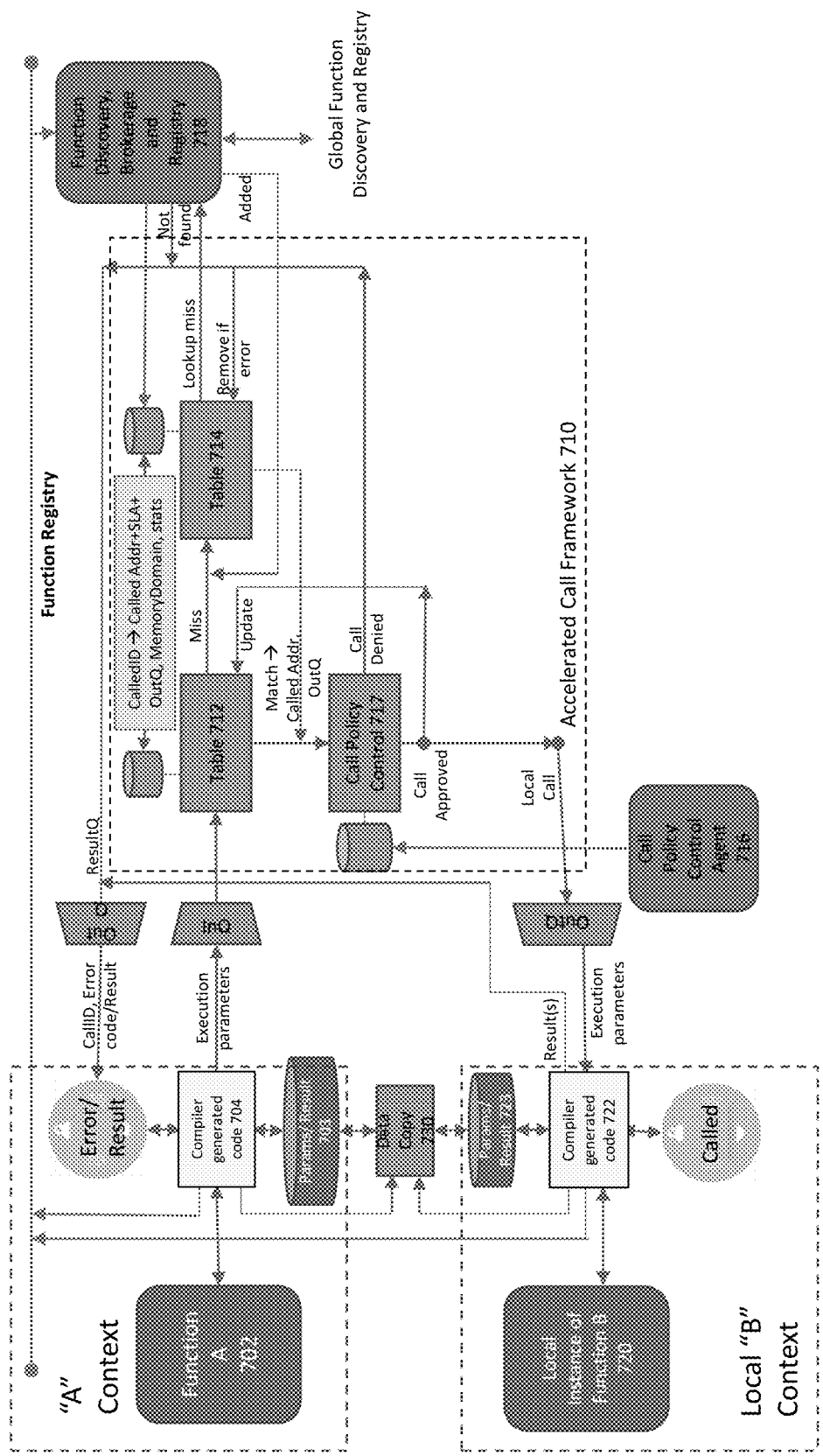

FIG. 9 depicts an example of processing of a job entry or work request. In this example, Function A 702 provides a command and execution parameters to queue InQ for performance by Function B 720. Accelerated call framework 710 can search in table 712 for the cached calling information based on CalledID (and potentially extra information) as a lookup key and determine an address of called function (Function B) and some of parameters for this particular instance of Function B (e.g., its queue ID (OutQ), its memory domain ID (to determine later whether to copy the data or provide a pointer), SLA, etc.). Table 712 can maintain the most recent and frequently used cached calling information for Function B and other functions. If the search in this table 712 fails, a full search of table 714 can occur next, which can include more function entries (e.g., global).

Table 714 can include multiple entries for desired function B (multiple instances both locally and remotely) with potentially different properties, such as memory domains, SLAs, etc. Table 714 may identify opportunities for or involve load balancing across instances to achieve better performance and resource utilization. Lookup of table 712 and table 714 may return multiple instances for further selection performed by call policy control 716 described below. Table 714 can be updated by a control plane when a new instance of any function is discovered, existing instance can be removed (e.g., crashed or terminated), or some properties of the instance have been changed (e.g., hardware resources used by a particular instance became unavailable that changed the SLA).

Function calls may be able to expose extra parameters to specify specific deadlines or SLA for data plane and control plane. In this case, accelerated call framework 710 could include a table (not shown) with several entries include one or more of: (1) source memory and target memory (e.g., memory from socket X to FPGA connected to socket Y of the same server) and (2) list of methods or hardware schemes for performing data plane. A scheme can include (a) scheme description (e.g., DMA, FPGA based, NIC based, and so forth), (b) performance (e.g., throughput, latency or both), and/or (c) cost (e.g., monetary cost or some similar type of metric). Hence, as the data plane is performed by framework 710, framework 710 uses the aforementioned data to decide what scheme is used to select a function for a particular call based on SLA, cost and available options.

In some cases, latency or throughput considers encapsulation and data transfer overhead arising out of pointer passing versus data encapsulation and transmission. For example, in some cases, an instance of function B that shares a memory domain with that of function A but is processor-executed software can complete in less time (e.g., lower latency) than a remote function B that is implemented as a hardware accelerator because data is not copied to and from a different domain and command encapsulation is not used.

If lookup for function B in table 714 also fails, search for function B either immediately fails with the error (e.g., job entry with error code is generated and placed into caller Function A result queue OutQ) or the function search utilizes Function Discovery, Brokerage and Registry 718. For example, if function B has not been called before by Function A, table 714 can be updated at the time of the first call instead of maintaining the entire global table independently on whether in this particular server any function ever calls function B. If function discovery, brokerage and registry 718 discovers the location(s) of Function B by requesting the information from other remote or centralized Function Discovery, Brokerage and Registry instances, tables 712 and 714 are populated with one or more remote instances of function B, and a selected instance of Function B is returned as a lookup success. Discovery of all available instances of Function B can proceed in parallel with execution of a particular call using one of already discovered instances. After Function B is identified as a remote function, tables 712 and 714 are updated and Function B can be identified more rapidly for subsequent calls to Function B.

In a case of lookup success (e.g., cache, full table or control plane), call control policy 717 can define which instance of Function B to select, if any. Call policy agent 716 can configure call control policy 717 to verify whether the particular call from this instance of Function A to an instance of Function B is allowed at this point of time, using access and rate control policies programmed by call control policy 717. For example, call policy control 717 can apply a hash of callerID, calledID to determine policies applicable to the function (e.g., ACL, rate control, call statistics).

Call control policy 717 can apply an Access Control List (ACL) lookup to determine whether Function B can be called by Function A at this time. If call policing fails (e.g., call to Function B is not allowed for whatever reason), the job entry is generated with an error code and placed into result queue (OutQ) of calling Function A. If call policing lookup is a success (e.g., call is allowed), it can generate an update instruction into table 712 to include an entry for Function B (e.g., in case the entry was not there but found by lookup of table 714 or control plane lookup), and places the job entry into the queue for a particular found instance of Function B (e.g., its queue OutQ). In addition, a lookup result translates a call pointer to indicate Function A to calling a specific Function B.

If Function A passes data to Function B, data can be copied to Parameters/Result block 723. In some examples, a first cache line of the passed data from Function A may be passed separately if the underlying hardware implementation can improve performance using such mechanism. Parameters/Result block 723 can utilize a "data copy" according to various manners (e.g., actual data copy, pointer, pointer translation). Actual action will depend on implementation, trust levels between functions, memory mapping scheme, and more. For example, if compiler generated code block 704 receives a pointer, the pointer or a translated pointer can be passed to Function B. If compiler generated code block 704 receives data, data can be passed to Function B; alternatively, a pointer to such data can be passed to Function B if this function has access right to function A memory (e.g., shared memory between functions A and B).

Function B's compiler generated code 722 can utilize one or more of OutQ queue entry availability schemes, where an available entry in OutQ receives a request from function A, including queue polling, waiting on semaphore, or waiting on memory (e.g., kernel or user space mwait( ) capability). After receiving such queue entry, Function B compiler generated code accesses data using block data copy 730. Data copy 730 can either pass the original pointer (e.g., where functions A and B are in the same virtual memory space and are trusted), or translate a pointer for use by Function B (e.g., based on physical memory space of Functions A and B), or copy data to Function B's memory space (e.g., if Function B is not fully trusted or not in the same enclave/physical memory space as Function A). Data can be copied into Params/Result database 723.

In a similar manner as Function A 702 passes data or pointers to Function B 720, Function B 720 can pass results data or pointers to Function A 702. Compiler generated code 722 of Function B 720 can provide result data to Function A 702 using Params/Result block 723. If result data is too large, then the data can be stored in a database and Function A 702 uses a data copy 730 to obtain the data, which may involve actual data copy, pointer translation or pointer passing. A resultQ (added to the call parameters by compiler generated code 704 of Function A 702) can be an identity of OutQ of Function A. Compiler generated code 722 of Function B 720 uses ResultQ to identify OutQ of Function A 702 for sending results.

Function B 720 can provide data results or error message to Function A 702 through queue OutQ associated with Function A. Compiler generated code 722 associated with Function B 720 can be used to transfer the results to queue OutQ associated with Function A 702. Result data transfer or error code transfer from Function B 720 to Function A 702 can follow a similar procedure or approach as that used to transfer data from Function A to Function B (e.g., pointer, virtual pointer, small or larger data copy). Similar to compiler generated code 722 waiting for OutQ entry availability, compiler generated code 704 of Function A 702 can utilize one or more of OutQ queue entry availability schemes, where an available entry in OutQ receives a request from function A, including queue polling, waiting on semaphore, or waiting on memory (e.g., kernel or user space mwait( ) capability). After receiving such queue entry, Function A 702 compiler generated code 704 either passes the error code to Function A 702 in case of error being returned by function B or Accelerated Call Framework 710, or accesses returned data using block data copy 730. Data copy 730 can either pass the original pointer (e.g., where functions A and B are in the same virtual memory space and are trusted), or translate a pointer for use by Function A (e.g., based on physical memory space of Functions A and B), or copy data to Function A's memory space (e.g., if Function B is not fully trusted or not in the same enclave/physical memory space as Function A). Data can be copied into Params/Result database 703.

Figure 10:
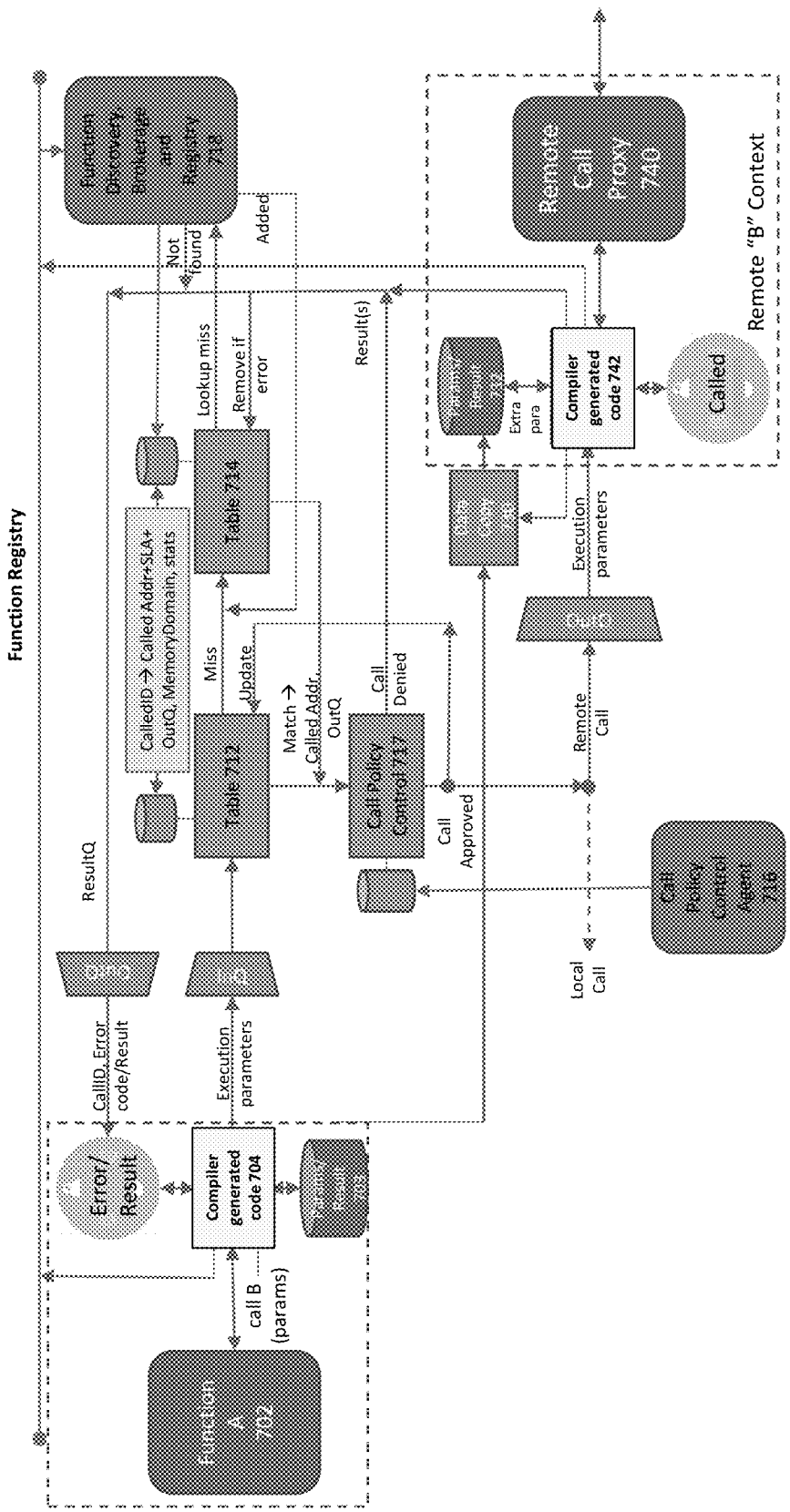

FIG. 10 depicts a scenario where multiple functions are available for use. In this example, an instance of Function B that is remote to Function A and accessible through Remote Call Proxy 740 is available for use. For simplicity the local instance of Function B is not depicted but is available. In this example, accelerated call framework 710 selects use of a remote instance of Function B. A remote path is similar to a local path to Function B, except remote Function B is represented by remote call proxy 740. Accelerated call framework 710 can use access remote call proxy 740 to generate a command to a remote function B. Remote call proxy 740 be executed on the same datacenter server, rack, or CPU node as that of Function A 702. In some examples, remote calls to remote functions can be performed by network interface or fabric interface. Remote call proxy 740 can perform call request transport over the available fabric(s), and perform data packetization, compression, encryption, encapsulation, reliable or unreliable transport, etc. In some examples, remote call proxy 740 can use gRPC for calls to remote functions. For example, remote call proxy 740 can make a gRPC compatible call to Function B with execution parameters over HTTP2.0/Secure Sockets Layer (SSL) or Transport Layer Security (TLS), including data compression/encryption as needed. Remote call proxy 740 can transmit data from function A 702 to a memory accessible to Function B. After a response is received from a remote Function B, the response can be provided to remote call proxy 740 and transferred to the output Q (OutQ) of Function A 702.

After a response is received from a remote Function B, the response is transferred to the output Q (OutQ) of Function A 702 by Remote Call Proxy 740 in the same way as explained in FIG. 9 with respect to Function B and its corresponding compiler generated code 722.

In some examples, a call next-in-chain( ) as opposed to Function call B( ) can be performed whereby function chains (sequences) are defined such that CalledID=f(CallerID, ContextID). A particular function (e.g., Function A) is not coded with a next executable function, but various embodiments automatically call the next function in a chain or sequence.

CalledID could be a function of a pre-assigned reserved value or another value programmed by the control plane for next-in-chain, CallerID, tenant, chainID). Lookup can be performed in a single operation, or alternatively in two or more operations steps. For example, a first lookup could be used to find CalledID as a function of CallerID, tenant and ChainID, and a second lookup could identify an instance of a next function to call.

In some examples, an executable binary of Function B can be stored in or by a compiler generated code 704 and provided to Function A. Ready-to-run code (e.g., Java script) of Function B can be passed as a parameter executed locally (and in an enclave with Function A) for this or next similar calls instead of performing the remote call every time. Such code can be received instead of or together with the first or any subsequent response from Function B or its corresponding Remote Call Proxy. Indication of existence of such code in the response could be part of the result return code, for example, followed by location of the code within the response and the code size. In addition, the first call to target function can be invoked to some default function (local or remote), which can identify the real function and send its code back. Return data or error can be provided by Function B to Function A in a similar manner as that described earlier with respect to local execution of Function B relative to Function A and data is passed using a pointer or pointer translation.

Received code can become part of compiler generated code 742, allowing it to execute the required code locally instead of sending request over the network. Alternatively, the received code can be passed to the control plane (not shown), deployed locally using such control plane as any other deployed function and registered via Function Discovery, Brokerage and Registry 718 allowing future calls to the function being found during table lookup 712 and/or 714.

Figure 11:
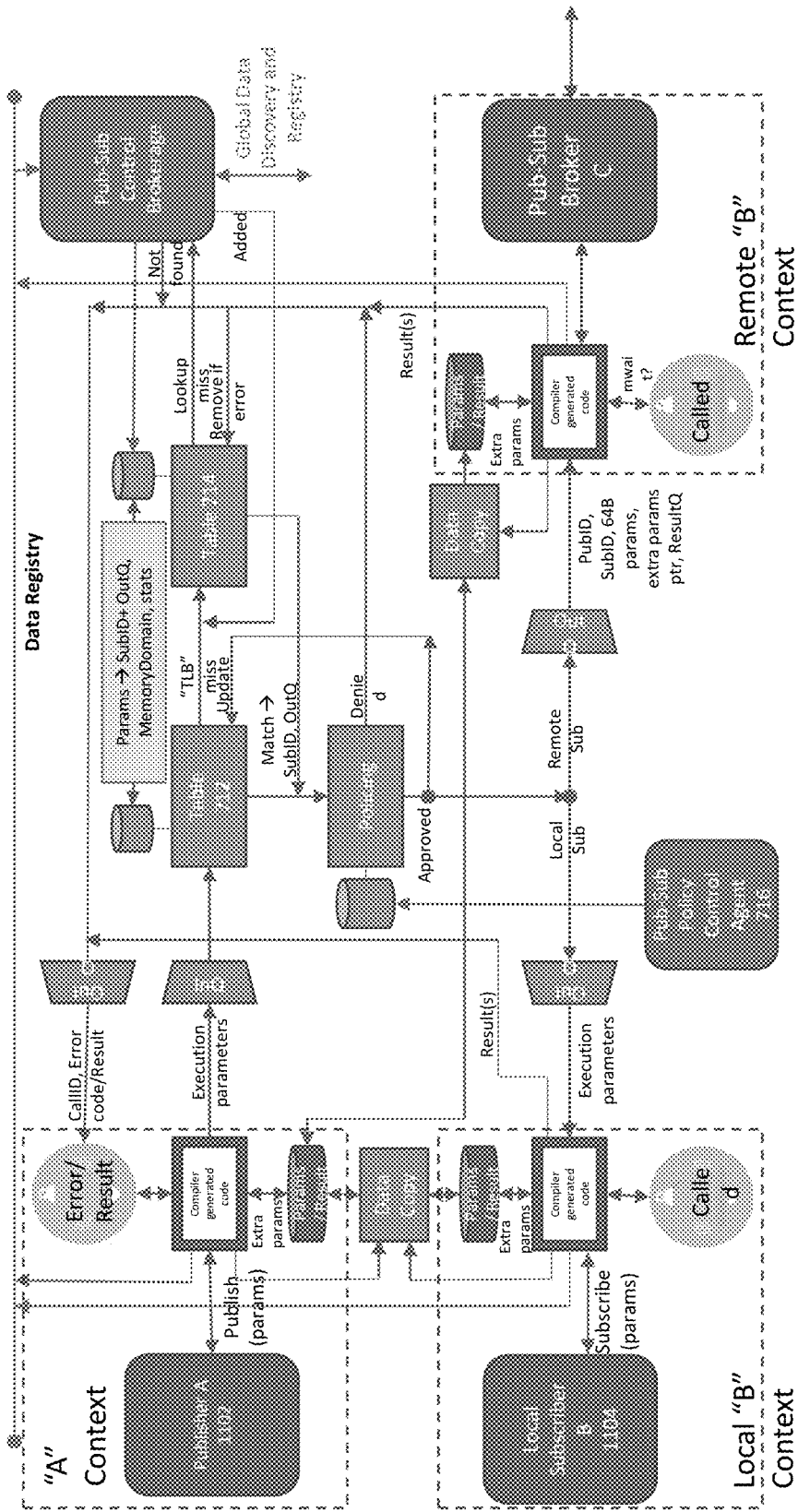

For instance, FIG. 11 shows acceleration of a publish-subscribe communication framework (e.g., Apache Kafka). A subscriber lookups to tables 712 and 714 attempt to identify one or more subscriber matches locally and remotely (e.g., subscriber 1104 or a remote instance of subscriber 1104). Subscriber matches can be added/discovered at run-time transparently to Publisher A 1102. The framework can select a remote or local subscriber and use a pointer, virtual pointer, or data copy to transfer data to a subscriber in manners described earlier.

Figure 12:
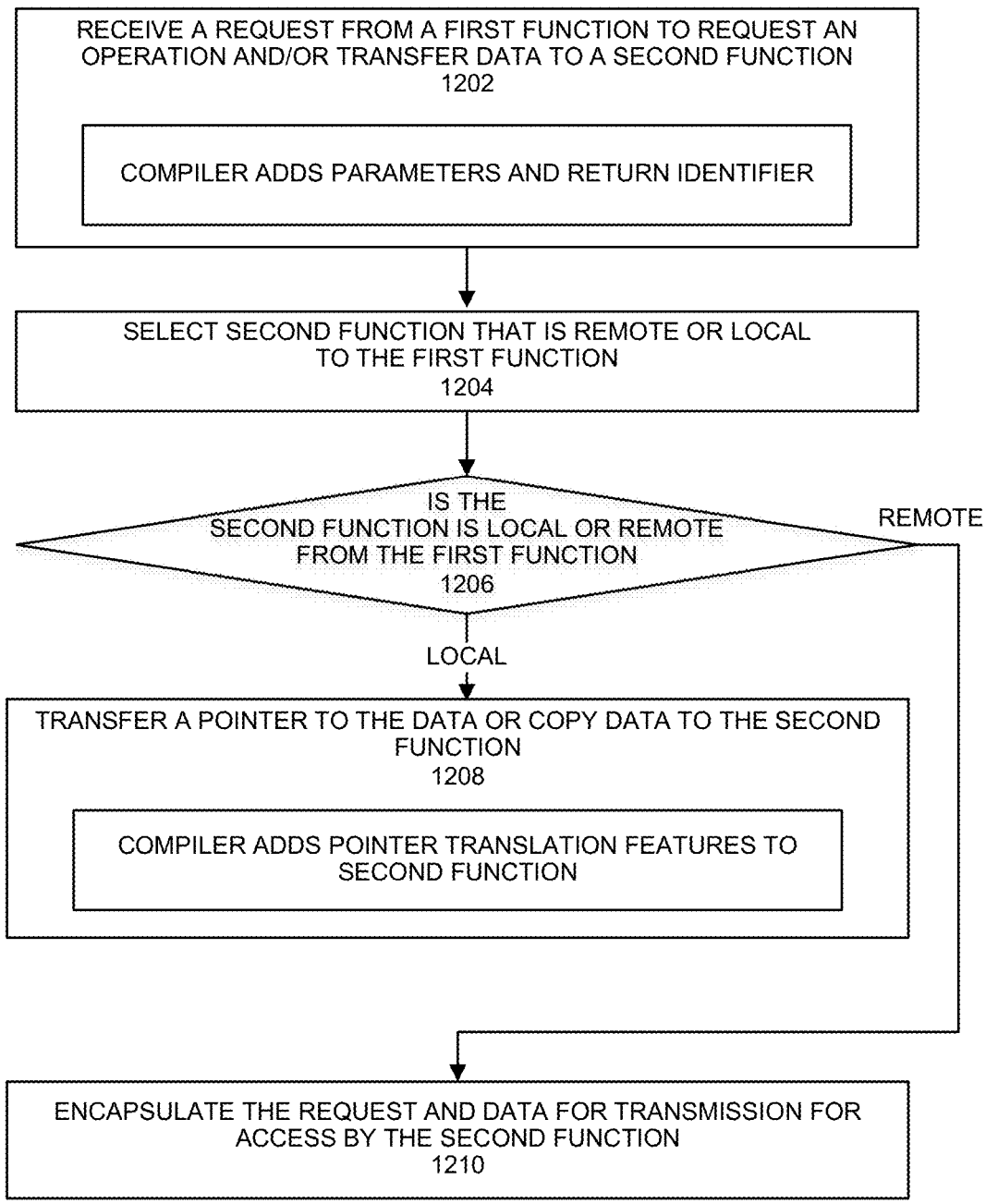
FIG. 12 depicts a process.

FIG. 12 depicts an example process. The process can be performed by a server to identify a next function to use in a sequence of chain of functions. At 1202, a request from a first function to request an operation and/or transfer data to a second function is received. The first function can be executing on a first device, rack, core, CPU node with one or multiple cores, or data center. The first function can include functionality provided by auto-generated compiler added code that: 1) translates the call into a job entry that includes CallID (e.g., maintain multiple outstanding calls from the same function), CalledID (e.g., ID of second function), first cache line of parameters, pointer to the rest of parameters, ResultQ (e.g., expected egress queue ID OutQ for the result(s)), and potentially other parameters (e.g., SLA). The second function can be local or remote from the first function.

At 1204, a second function can be chosen that is remote or local to the first function. For example, multiple instances of the second function can be available, where some instances are local to the first function and some instances are remote from the first function. A second function can be chosen for use based on lowest latency, a priority scheme, or load balancing, or other criteria. A verification can take place whether the particular call from this instance of the first function to an instance of second function is allowed using access and rate control policies.

At 1206, a determination is made whether the second function is local or remote from the first function. If the selected second function is local to the first function, 1208 can follow. If the selected second function is remote to the first function, 1210 can follow. The second function can be considered local to the first function if one or more of the following is satisfied: they execute in the same virtual machine, they execute in the same container, they execute using the same operating system, they execute in the same CPU node, they execute in the same server, they execute in the same data center, they share the same physical or virtual memory space, or they are in a trusted enclave. The second function can be considered remote from the first function if one or more of the following is satisfied: they do not share virtual or physical memory space or they are not in the same enclave or the access to that function is over the network/fabric involving significantly higher access latency compared to a local function.

At 1208, if a second function is chosen as local to the first function, a pointer to the data can be transferred to the second function or the data can be copied to a memory accessible to the second function. The second function can include auto-generated code added by a compiler to include functionality that may perform either pointer translation (in case of different virtual memory spaces between first and second functions) or full data copy (in case of different physical memory spaces for first and second functions).

If the first and second function are in the same virtual memory domain, a memory pointer can be provided to the second function without translation. If the first and second function are in the same physical memory domain but different virtual memory domains, a virtual memory pointer can be provided to the second function and the virtual memory pointer is translated so the second function can access the data. If the first and the second functions do not share trust (e.g. they are in different enclaves), the data is copied from first function memory domain into the second function memory domain enabling data access by the second function.

At 1210, if a second function is chosen as remote from the first function, the request and data are encapsulated for transmission to the second function. A gRPC scheme or other RPC schemes or similar schemes can be used to encapsulate request and data for transmission to the remote second function.

Figure 13:
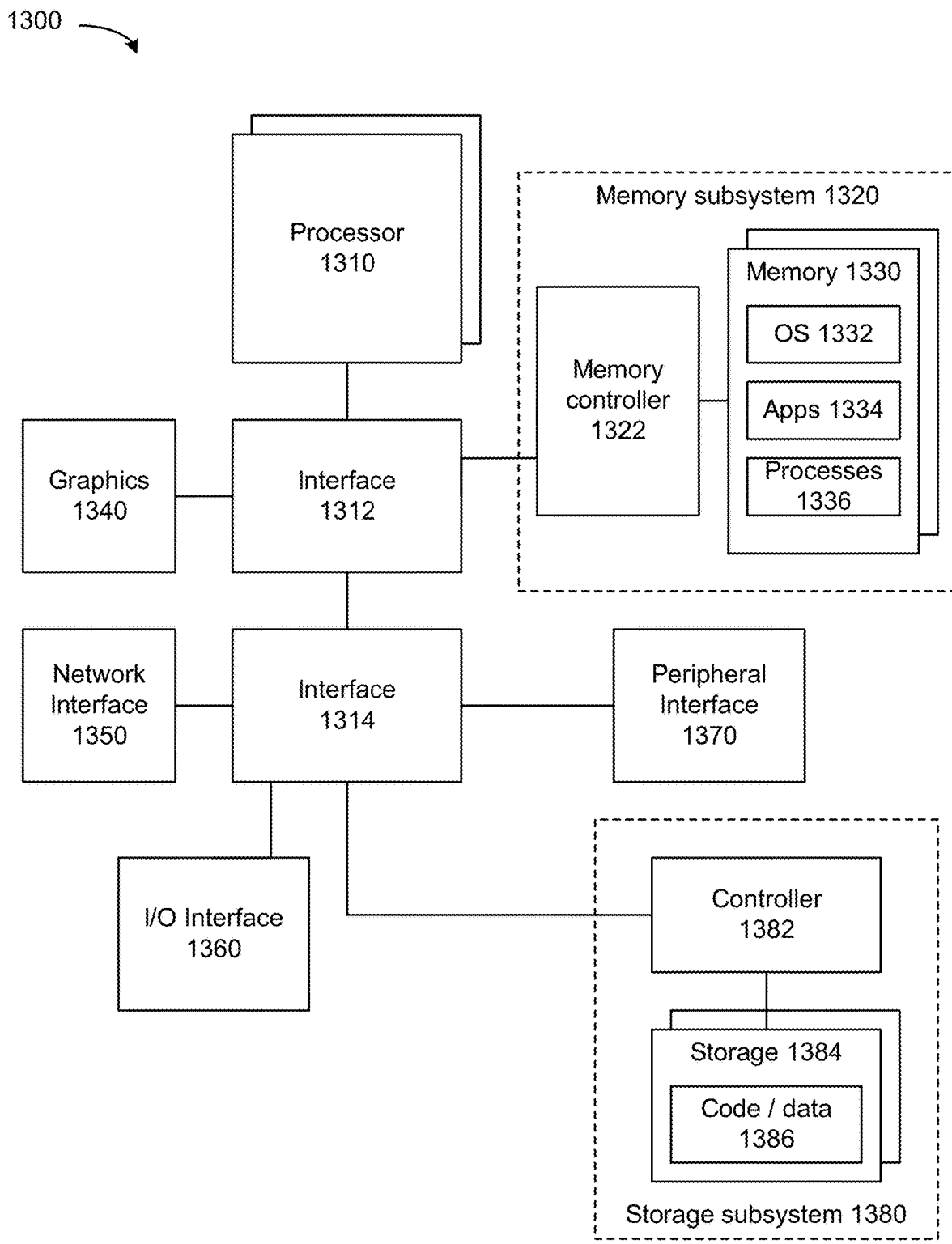
FIG. 13 depicts a system.

FIG. 13 depicts a system. The system can use embodiments described herein to execute one or more functions and call execution of another function. System 1300 includes processor 1310, which provides processing, operation management, and execution of instructions for system 1300. Processor 1310 can include any type of microprocessor, central processing unit (CPU), graphics processing unit (GPU), processing core, or other processing hardware to provide processing for system 1300, or a combination of processors. Processor 1310 controls the overall operation of system 1300, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1300 includes interface 1312 coupled to processor 1310, which can represent a higher speed interface or a high throughput interface for system components that needs higher bandwidth connections, such as memory subsystem 1320 or graphics interface components 1340, or accelerators 1342. Interface 1312 represents an interface circuit, which can be a standalone component or integrated onto a processor die. Where present, graphics interface 440 interfaces to graphics components for providing a visual display to a user of system 1300. In one example, graphics interface 1340 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1340 generates a display based on data stored in memory 1330 or based on operations executed by processor 1310 or both. In one example, graphics interface 1340 generates a display based on data stored in memory 1330 or based on operations executed by processor 1310 or both.

Accelerators 1342 can be a programmable or fixed function offload engine that can be accessed or used by a processor 1310. For example, an accelerator among accelerators 1342 can provide compression (DC) capability, cryptography services such as public key encryption (PKE), cipher, hash/authentication capabilities, decryption, or other capabilities or services. In some embodiments, in addition or alternatively, an accelerator among accelerators 1342 provides field select controller capabilities as described herein. In some cases, accelerators 1342 can be integrated into a CPU socket (e.g., a connector to a motherboard or circuit board that includes a CPU and provides an electrical interface with the CPU). For example, accelerators 1342 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 1342 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1320 represents the main memory of system 1300 and provides storage for code to be executed by processor 1310, or data values to be used in executing a routine. Memory subsystem 1320 can include one or more memory devices 1330 such as read-only memory (ROM), flash memory, one or more varieties of random access memory (RAM) such as DRAM, or other memory devices, or a combination of such devices. Memory 1330 stores and hosts, among other things, operating system (OS) 1332 to provide a software platform for execution of instructions in system 1300. Additionally, applications 1334 can execute on the software platform of OS 1332 from memory 1330. Applications 1334 represent programs that have their own operational logic to perform execution of one or more functions. Processes 1336 represent agents or routines that provide auxiliary functions to OS 1332 or one or more applications 1334 or a combination. OS 1332, applications 1334, and processes 1336 provide software logic to provide functions for system 1300. In one example, memory subsystem 1320 includes memory controller 1322, which is a memory controller to generate and issue commands to memory 1330. It will be understood that memory controller 1322 could be a physical part of processor 1310 or a physical part of interface 1312. For example, memory controller 1322 can be an integrated memory controller, integrated onto a circuit with processor 1310.

While not specifically illustrated, it will be understood that system 1300 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1300 includes interface 1314, which can be coupled to interface 1312. In one example, interface 1314 represents an interface circuit, which can include standalone components and integrated circuitry. In one example, multiple user interface components or peripheral components, or both, couple to interface 1314. Network interface 1350 provides system 1300 the ability to communicate with remote devices (e.g., servers or other computing devices) over one or more networks. Network interface 1350 can include an Ethernet adapter, wireless interconnection components, cellular network interconnection components, USB (universal serial bus), or other wired or wireless standards-based or proprietary interfaces. Network interface 1350 can transmit data to a device that is in the same data center or rack or a remote device, which can include sending data stored in memory. Network interface 1350 can receive data from a remote device, which can include storing received data into memory. Various embodiments can be used in connection with network interface 1350, processor 1310, and memory subsystem 1320.

In one example, system 1300 includes one or more input/output (I/O) interface(s) 1360. I/O interface 1360 can include one or more interface components through which a user interacts with system 1300 (e.g., audio, alphanumeric, tactile/touch, or other interfacing). Peripheral interface 1370 can include any hardware interface not specifically mentioned above. Peripherals refer generally to devices that connect dependently to system 1300. A dependent connection is one where system 1300 provides the software platform or hardware platform or both on which operation executes, and with which a user interacts.

In one example, system 1300 includes storage subsystem 1380 to store data in a nonvolatile manner. In one example, in certain system implementations, at least certain components of storage 1380 can overlap with components of memory subsystem 1320. Storage subsystem 1380 includes storage device(s) 1384, which can be or include any conventional medium for storing large amounts of data in a nonvolatile manner, such as one or more magnetic, solid state, or optical based disks, or a combination. Storage 1384 holds code or instructions and data 1386 in a persistent state (i.e., the value is retained despite interruption of power to system 1300). Storage 1384 can be generically considered to be a "memory," although memory 1330 is typically the executing or operating memory to provide instructions to processor 1310. Whereas storage 1384 is nonvolatile, memory 1330 can include volatile memory (i.e., the value or state of the data is indeterminate if power is interrupted to system 1300). In one example, storage subsystem 1380 includes controller 1382 to interface with storage 1384. In one example controller 1382 is a physical part of interface 1314 or processor 1310 or can include circuits or logic in both processor 1310 and interface 1314.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 1300. More specifically, power source typically interfaces to one or multiple power supplies in system 1300 to provide power to the components of system 1300. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1300 can be implemented using interconnected compute sleds of processors, memories, storages, network interfaces, and other components. High speed interconnects can be used such as compatible at least with Ethernet, PCIe, Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, CCIX, 3GPP Long Term Evolution (LTE) (4G), 3GPP 5G, and variations thereof. Communications can be compatible with remote direct memory access (RDMA), InfiniB and, Internet Wide Area RDMA Protocol (iWARP), Transmission Control Protocol (TCP), user datagram protocol (UDP), quick UDP Internet Connections (QUIC), or RDMA over Converged Ethernet (RoCE). Data and logs can be stored and accessed using virtualized storage nodes using a protocol such as NVMe over Fabrics (NVMe-oF).

Figure 14:
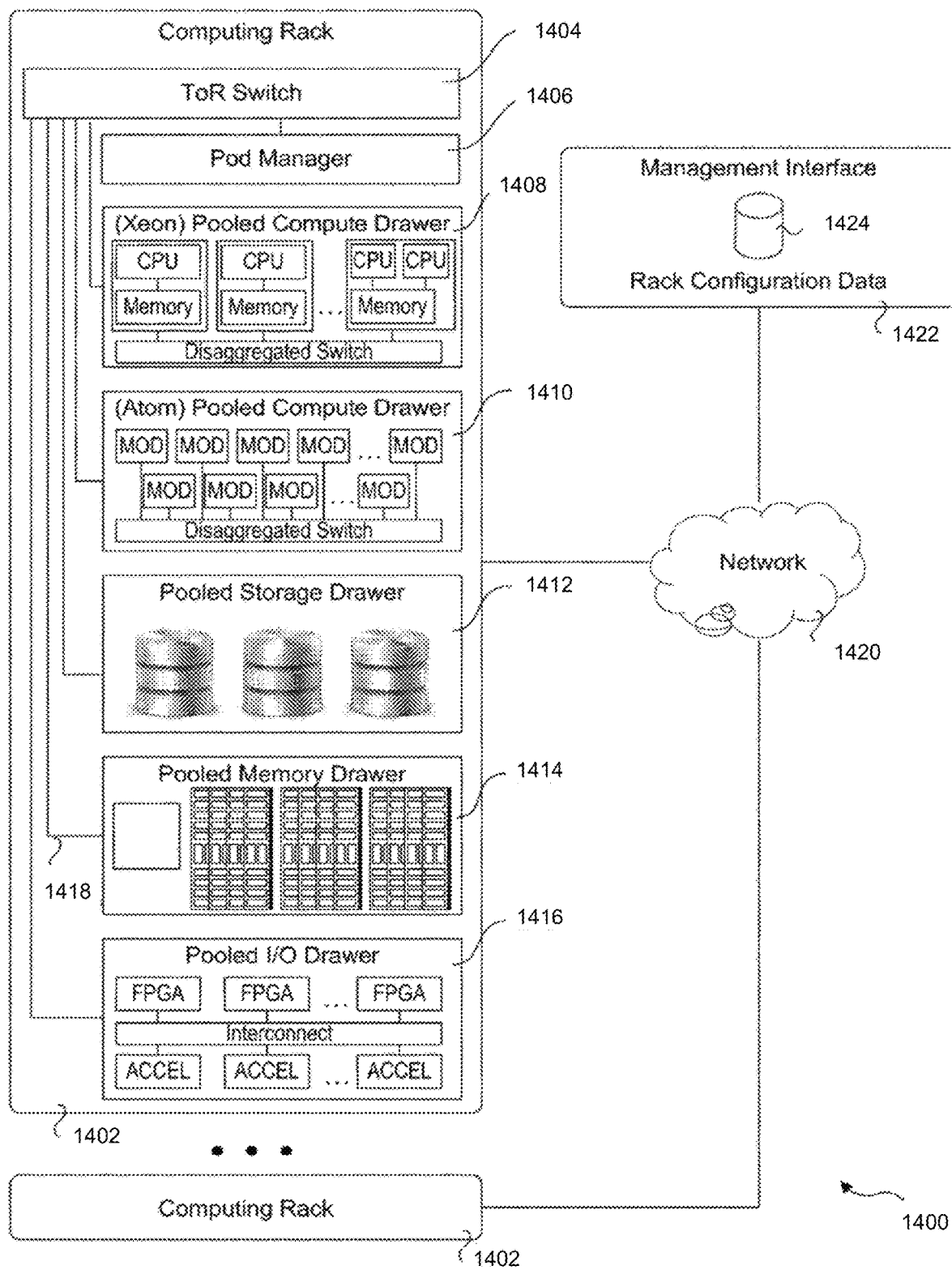
FIG. 14 depicts an environment.

FIG. 14 depicts an environment 1400 includes multiple computing racks 1402, some including a Top of Rack (ToR) switch 1404, a pod manager 1406, and a plurality of pooled system drawers. Various embodiments can be used in connection with programming or receiving content from forwarding elements acting network testers. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1408, and Intel® ATOM™ pooled compute drawer 1410, a pooled storage drawer 1412, a pooled memory drawer 1414, and a pooled I/O drawer 1416. Some of the pooled system drawers is connected to ToR switch 1404 via a high-speed link 1418, such as a 40 Gigabit/second (Gb/s) or 100 Gb/s Ethernet link or a 100+Gb/s Silicon Photonics (SiPh) optical link.

Multiple of the computing racks 1402 may be interconnected via their ToR switches 1404 (e.g., to a pod-level switch or data center switch), as illustrated by connections to a network 1420. In some embodiments, groups of computing racks 1402 are managed as separate pods via pod manager(s) 1406. In one embodiment, a single pod manager is used to manage racks in the pod. Alternatively, distributed pod managers may be used for pod management operations.

Environment 1400 further includes a management interface 1422 that is used to manage various aspects of the environment. This includes managing rack configuration, with corresponding parameters stored as rack configuration data 1424.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

Figure 15:
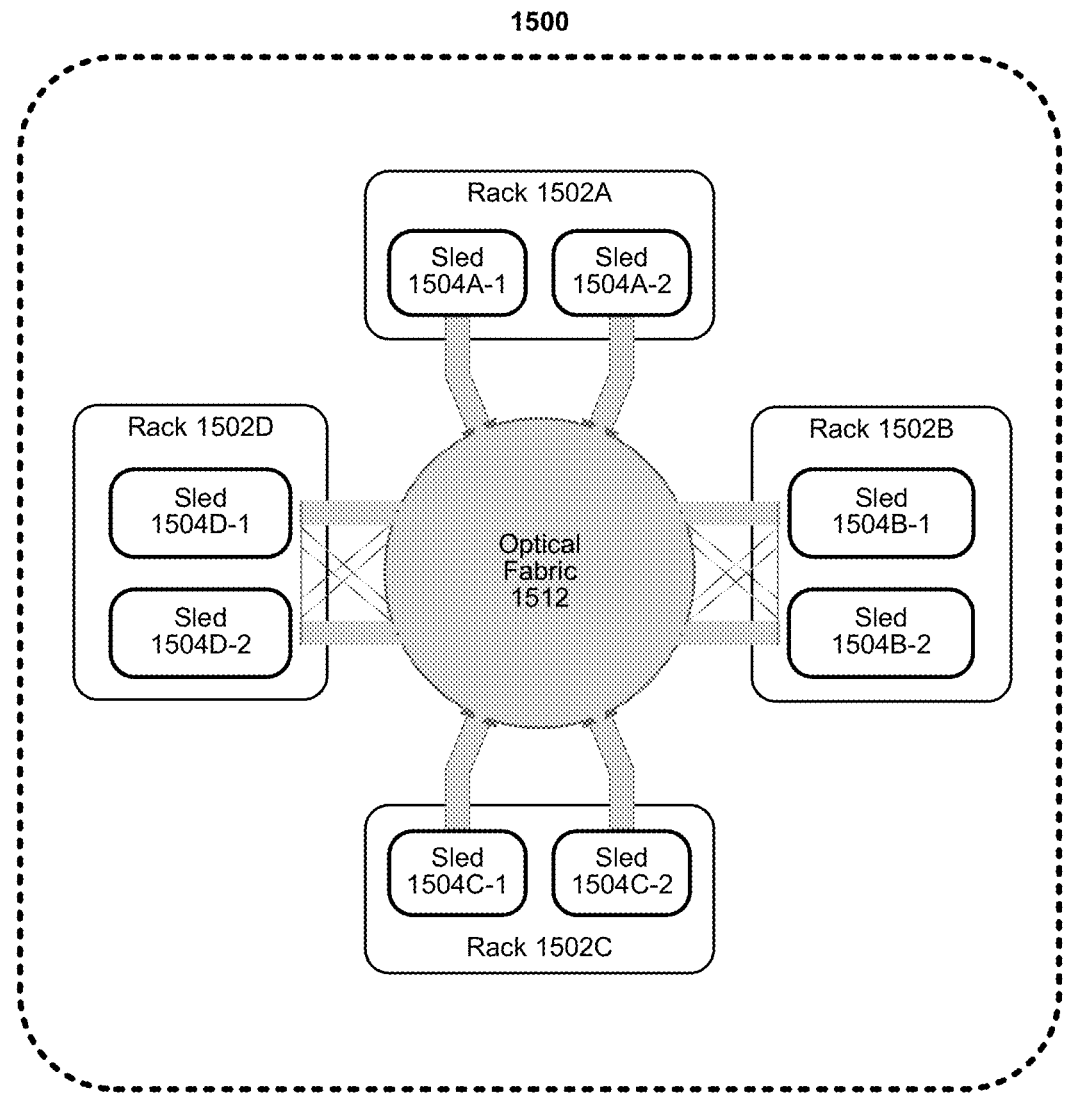
FIG. 15 depicts a data center.

FIG. 15 depicts an example of a data center. Various embodiments can be used to call other functions within the data center example. As shown in FIG. 15, data center 1500 may include an electrical and/or optical fabric 1512. Optical fabric 1512 may generally include a combination of optical signaling media (such as optical cabling) and optical switching infrastructure via which any particular sled in data center 1500 can send signals to (and receive signals from) each of the other sleds in data center 1500. The signaling connectivity that optical fabric 1512 provides to any given sled may include connectivity both to other sleds in a same rack and sleds in other racks. Data center 1500 includes four racks 1502A to 1502D and racks 1502A to 1502D house respective pairs of sleds 1504A-1 and 1504A-2, 1504B-1 and 1504B-2, 1504C-1 and 1504C-2, and 1504D-1 and 1504D-2. Thus, in this example, data center 1500 includes a total of eight sleds. Optical fabric 1512 can provide each sled signaling connectivity with one or more of the seven other sleds. For example, via optical fabric 1512, sled 1504A-1 in rack 1502A may possess signaling connectivity with sled 1504A-2 in rack 1502A, as well as the six other sleds 1504B-1, 1504B-2, 1504C-1, 1504C-2, 1504D-1, and 1504D-2 that are distributed among the other racks 1502B, 1502C, and 1502D of data center 1500. The embodiments are not limited to this example. For example, fabric 1512 can provide optical and/or electrical signaling.

A network device can leverage a server or computing platform to perform packet processing using Network Function Virtualization (NFV), software-defined networking (SDN), virtualized network function (VNF), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. VNF can include a service chain or sequence of virtualized tasks executed on generic configurable hardware such as firewalls, domain name system (DNS), caching or network address translation (NAT) and can run in virtual execution environments. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes at least one non-transitory computer-readable medium comprising instructions stored thereon, that if executed by at least one processor, cause the at least one processor to: in a service chain of functions, request execution of a workload by a next function with data transport overhead selected based on memory sharing capability and trust level with the next function.

Example 2 includes any example, wherein the memory sharing capability with the next function is based on one or more of: whether the next function shares an enclave or trusted domain with a function in the service chain, the next function shares physical memory domain with a function in the service chain, or the next function shares virtual memory domain with a function in the service chain.

Example 3 includes any example, wherein data transport overhead comprises one or more of: sending a memory address pointer to data, sending a translated virtual memory address pointer and pointer translation to access data, or sending data to the next function.

Example 4 includes any example, and including instructions stored thereon, that if executed by at least one processor, cause the at least one processor to: select the next function from among multiple instances of the next function based on one or more of: sharing of memory domain with a function in the service chain, throughput performance, latency, cost, load balancing, or service legal agreement (SLA) requirements.

Example 5 includes any example, and including instructions stored thereon, that if executed by at least one processor, cause the at least one processor to: identify at least one available instance of the next function, wherein the next function comprises use of one or more of: an accelerator, a network interface, an encryption/decryption circuitry, a graphics processing unit (GPU), a central processing unit (CPU), hardware function, or a processor-executed function.

Example 6 includes any example, and including instructions stored thereon, that if executed by at least one processor, cause the at least one processor to: generate, by a compiler, executable code to include with a work requesting function in the service chain to translate a call to another function to a work request from the work requesting function to include one or more of: a work requesting function identifier, a next function identifier, or a result queue.

Example 7 includes any example, and including instructions stored thereon, that if executed by at least one processor, cause the at least one processor to: generate, by a compiler, executable code to include with the next function to perform one or more of: pointer translation or receipt of a data copy.

Example 8 includes any example, and including instructions stored thereon, that if executed by at least one processor, cause the at least one processor to: based on the next function not sharing an enclave and memory with a work requesting function, encapsulate the request for execution of a workload and transmit the request and associated data in a remote procedure call.

Example 9 includes any example, and includes an apparatus comprising: a cache and at least one processor core coupled to the cache, the at least one processor core to: identify multiple available instances of a function available to call, the multiple available instances provided on at least one platform and as hardware or processor-executed software and select a second function in a sequence of functions from multiple identified available instances of the second function.

Example 10 includes any example, wherein the at least one processor is to select a second function in a sequence of functions from multiple identified available instances of the second function based on one or more of: a calling function sharing an enclave with the second function, a calling function sharing a memory domain with the second function, throughput performance of instances of the second function, latency of instances of the second function, cost of use of instances of the second function, load balancing of instances of the second function, or service legal agreement (SLA) requirements.

Example 11 includes any example, wherein a calling function sharing a memory domain with the second function is based on one or more of: execution on a same core, execution on a same central processing unit socket, execution on a same rack, or execution on a same server.

Example 12 includes any example, wherein the at least one processor is to select a second function in a sequence of functions from multiple identified available instances of the second function based on a look-up of available instances of the second function in one or more of: a table of recently requested functions, a table of available function instances, or a function discovery registry.

Example 13 includes any example, wherein the at least one processor is to identify and select based on receipt of a request for performance of a second function with one or more execution parameters.

Example 14 includes any example, wherein the request for performance of a second function with one or more execution parameters comprises a request for performance of a second function from a first function and wherein the at least one processor is to apply data transport overhead set based on memory sharing capability between the first function and the second function.

Example 15 includes any example, wherein the at least one processor is to apply data transport overhead comprising send a memory address pointer to data to the second function based on the first and second functions sharing memory space.

Example 16 includes any example, wherein the at least one processor is to apply data transport overhead comprising send a virtual memory address pointer to data to the second function based on the first and second functions sharing virtual memory space.

Example 17 includes any example, wherein the at least one processor is to apply data transport overhead comprising send data from the first function to the second function.

Example 18 includes any example, and including one or more of: a data center, server, or rack.

Example 19 includes any example, and includes a method for determining a next function to call in a service chain of functions, the method comprising: modifying a work request from a function to identify a function identifier and return queue; selecting the next function from multiple available instances of the next function; and based at least on the selected next function sharing an enclave or trusted domain with the function, providing a pointer to data for access by the next function.

Example 20 includes any example, wherein the pointer comprising a physical memory pointer or a virtual domain memory pointer.

Example 21 includes any example, and includes: based on the selected next function not being in a same enclave or trusted domain as that of the function, copying data to a memory accessible to the selected next function.

Example 22 includes any example, and includes: providing an executable copy of the selected next function for execution on a same platform as that of the function.

What is claimed is:

1. At least one non-transitory computer-readable medium comprising instructions stored thereon, that if executed by at least one processor, cause the at least one processor to:
   in a service chain of services, request execution of a workload by a second service with data transport overhead selected based on memory sharing capability and trust level with the second service, wherein the data transport overhead comprises a format, selected from multiple formats, for sharing data and
   based on the second service not sharing an enclave and memory with a work requesting service, encapsulate the request for execution of the workload and transmit the request for execution of the workload and associated data in a remote procedure call to the second service.

2. The at least one non-transitory computer-readable medium of claim 1, wherein the memory sharing capability with the second service is based on one or more of: whether the second service shares an enclave or trusted domain with a service in the service chain, the second service shares physical memory domain with a service in the service chain, or the second service shares virtual memory domain with a service in the service chain.

3. The at least one non-transitory computer-readable medium of claim 1, comprising instructions stored thereon, that if executed by at least one processor, cause the at least one processor to:
   select the data transport overhead from among: sending a remote procedure call (RPC), sending a memory address pointer to data, sending a translated virtual memory address pointer and pointer translation to access data, and sending data to the second service.

4. The at least one non-transitory computer-readable medium of claim 1, comprising instructions stored thereon, that if executed by at least one processor, cause the at least one processor to:
   select the second service from among multiple instances of the second service based on one or more of: sharing of memory domain with a service in the service chain, throughput performance, latency, cost, load balancing, or service legal agreement (SLA) requirements.

5. The at least one non-transitory computer-readable medium of claim 1, comprising instructions stored thereon, that if executed by at least one processor, cause the at least one processor to:
   identify at least one available instance of the second service, wherein the second service comprises use of one or more of: an accelerator, a network interface, an encryption/decryption circuitry, a graphics processing unit (GPU), a central processing unit (CPU), hardware service, or a processor-executed service.

6. The at least one non-transitory computer-readable medium of claim 1, comprising instructions stored thereon, that if executed by at least one processor, cause the at least one processor to:
   generate, by a compiler, executable code to include with the work requesting service in the service chain to translate a call to the second service to include one or more of: a work requesting service identifier, a second service identifier, or a result queue.

7. The at least one non-transitory computer-readable medium of claim 1, comprising instructions stored thereon, that if executed by at least one processor, cause the at least one processor to:
generate, by a compiler, executable code to include with the second service to perform one or more of: pointer translation or receipt of a data copy.

8. An apparatus comprising:
a cache and
at least one processor core coupled to the cache, the at least one processor core to:
identify multiple available instances of a service available to call from a first service, the multiple available instances provided on at least one platform and as hardware or processor-executed software;
select a second service in a sequence of services from the identified multiple available instances of the second service;
select a data sharing communication format, from among multiple data sharing communication formats, based in part on memory sharing capability and trust level between the first service and the selected second service; and
based on the selected second service not sharing an enclave and memory with the first service, encapsulate a request for execution of a workload and transmit the request and associated data in a remote procedure call to the selected second service.

9. The apparatus of claim 8, wherein the at least one processor is to select the second service in the sequence of services from the identified multiple available instances of the second service is based on one or more of: the first service sharing an enclave with the second service, the first service sharing a memory domain with the second service, throughput performance of instances of the second service, latency of instances of the second service, cost of use of instances of the second service, load balancing of instances of the second service, or service legal agreement (SLA) requirements.

10. The apparatus of claim 9, wherein the first service sharing a memory domain with the second service is based on one or more of: execution on a same core, execution on a same central processing unit socket, execution on a same rack, or execution on a same server.

11. The apparatus of claim 8, wherein the at least one processor is to select the second service in the sequence of services from multiple identified available instances of the second service based on a look-up of available instances of the second service in one or more of: a table of recently requested services, a table of available service instances, or a service discovery registry.

12. The apparatus of claim 8, wherein the at least one processor is to identify and select based on receipt of a request for performance of the second service with one or more execution parameters.

13. The apparatus of claim 12, wherein the request for performance of the second service with one or more execution parameters comprises a request for performance of a second service from the first service.

14. The apparatus of claim 8, wherein the at least one processor is to select the data sharing communication as send a memory address pointer to data to the second service based on the first and second services sharing memory space.

15. The apparatus of claim 8, wherein the at least one processor is to select the data sharing communication as send a virtual memory address pointer to data to the second service based on the first and second services sharing virtual memory space.

16. The apparatus of claim 8, wherein the at least one processor is to select the data sharing communication as send data from the first service to the second service based on the first and second services not being in a same enclave or trusted domain.

17. The apparatus of claim 8, comprising one or more of: a data center, server, or rack and wherein the data center, server, or rack comprises the cache and the at least one processor core coupled to the cache.

18. A method for determining a second service to call in a service chain of services, the method comprising:
modifying a work request from a service to identify a service identifier and return queue;
selecting the second service from multiple available instances of the second service;
selecting a data sharing communication format, from among multiple data sharing communication formats, between the service and the second service based in part on memory sharing capability and trust level between the service and the second service;
based at least on the selected second service sharing an enclave or trusted domain with the service, the selecting the data sharing communication format comprises selecting providing a pointer to data for access by the second service; and
based on the selected second service not being in a same enclave or trusted domain as that of the service, the selecting the data sharing communication format comprises selecting copying data to a memory accessible to the selected second service.

19. The method of claim 18, wherein the pointer comprising a physical memory pointer or a virtual domain memory pointer.

20. The method of claim 18, comprising:
providing an executable copy of the selected second service for execution on a same platform as that of the service.

21. At least one non-transitory computer-readable medium comprising instructions stored thereon, that if executed by at least one processor, cause the at least one processor to:
based on memory sharing capability and trust level of a receiver, selecting from use of remote procedure call (RPC) and at least one other data sharing communication to share data among first and second applications and
based on the second application not sharing an enclave and memory with the first application, encapsulate a request for execution of a workload by the second application and transmit the request and associated data in an RPC to the second application, wherein
the data is stored on one more or more memory devices;
the memory sharing capability is associated with the one or more memory devices and the first application executes on a processor of the at least one processor.

22. The computer-readable medium of claim 21, wherein the at least one other data sharing communication to share data comprises providing a pointer to a memory address.

23. The computer-readable medium of claim 21, wherein the at least one other data sharing communication to share data comprises providing encrypted data.

24. The computer-readable medium of claim 21, wherein the RPC comprises Google RPC (gRPC).

\* \* \* \* \*